(12) United States Patent
Okada et al.

(10) Patent No.: US 9,075,729 B2
(45) Date of Patent: Jul. 7, 2015

(54) STORAGE SYSTEM AND METHOD OF CONTROLLING DATA TRANSFER IN STORAGE SYSTEM

(75) Inventors: Naoya Okada, Yokohama (JP);
Masanori Takada, Yokohama (JP);
Hiroshi Hirayama, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 439 days.

(21) Appl. No.: 13/511,888

(22) PCT Filed: May 16, 2012

(86) PCT No.: PCT/JP2012/003186
§ 371 (c)(1),
(2), (4) Date: May 24, 2012

(87) PCT Pub. No.: WO2013/171789
PCT Pub. Date: Nov. 21, 2013

(65) Prior Publication Data
US 2013/0311706 A1 Nov. 21, 2013

(51) Int. Cl.
*G06F 12/02* (2006.01)
*G06F 12/08* (2006.01)
*G06F 13/16* (2006.01)

(52) U.S. Cl.
CPC ........ *G06F 12/0868* (2013.01); *G06F 13/1694* (2013.01); *G06F 2212/312* (2013.01); *G06F 12/0888* (2013.01)

(58) Field of Classification Search
CPC ... G06F 3/061–3/0613; G06F 3/0655–3/0656; G06F 12/0888; G06F 13/1652–13/1673; G06F 13/1694; G06F 2212/312

USPC .......................................... 711/135, 138–139
See application file for complete search history.

(56) References Cited

U.S. PATENT DOCUMENTS

| 4,433,374 | A  | * | 2/1984  | Hanson et al. | ................ | 711/138 |
| 6,378,047 | B1 | * | 4/2002  | Meyer | ........................... | 711/135 |
| 6,591,332 | B1 | * | 7/2003  | Swanson et al. | .............. | 711/108 |
| 2004/0268049 | A1 | * | 12/2004 | Madter | ......................... | 711/133 |

(Continued)

FOREIGN PATENT DOCUMENTS

JP        2010-033125        2/2010

OTHER PUBLICATIONS

PCI Express Base Specification, Rev. 3.0; ; released Nov. 10, 2010; pp. 81-83, 561-563.

(Continued)

*Primary Examiner* — Aimee Li
*Assistant Examiner* — Nicholas Simonetti
(74) *Attorney, Agent, or Firm* — Foley & Lardner LLP

(57) ABSTRACT

An embodiment of the present invention is a storage system including a plurality of non-volatile storage devices for storing user data, and a controller for controlling data transfer between the plurality of non-volatile storage devices and a host. The controller includes a processor core circuit, a processor cache, and a primary storage device including a cache area for temporarily storing user data. The processor core circuit ascertains contents of a command received from the host. The processor core circuit ascertains a retention storage device of data to be transferred in the storage system in operations responsive to the command. The processor core circuit determines whether to transfer the data via the processor cache in the storage system, based on a type of the command and the ascertained retention storage device.

15 Claims, 19 Drawing Sheets

(56) References Cited

U.S. PATENT DOCUMENTS

| | | |
|---|---|---|
| 2007/0124407 A1* | 5/2007 | Weber et al. ................. 709/212 |
| 2008/0244186 A1* | 10/2008 | Bose et al. ................... 711/135 |
| 2010/0023655 A1 | 1/2010 | Hirayama |
| 2010/0088469 A1* | 4/2010 | Motonaga et al. ............ 711/113 |
| 2010/0269021 A1* | 10/2010 | Gower et al. ................. 714/764 |

OTHER PUBLICATIONS

Intel® Data Direct I/O Technology (Intel® DDIO): A Primer, Technical Brief; Revision 1.0; Feb. 2012; pp. 1-11.

* cited by examiner

STORAGE SYSTEM AND METHOD OF CONTROLLING DATA TRANSFER IN STORAGE SYSTEM

TECHNICAL FIELD

This invention relates to a storage system and a method of controlling data transfer in a storage system.

BACKGROUND ART

In typical, a storage apparatus includes a disk array of magnetic disk drives or flash memory devices and a storage controller for controlling data transfer between the disk array and a host computer. The storage controller includes a host interface of a device for connecting to the host computer, a drive interface of a device for connecting to the disk array, a primary storage device including a cache area used to store data frequently referenced by the host computer or data to be transferred, and a processor.

These components may be duplicated to increase the availability of the storage apparatus. In such a case, a set of the components is referred to as a cluster and clusters may be interconnected with a dedicated interface. For example, JP 2010-033125 A (PTL 1) discloses a technique to access a cache area retaining requested data in a cluster from a host interface in a different cluster to which a host computer is connected, in a storage system including a storage-dedicated LSI.

Another document, PCI-Express Base Specification Revision 3.0 (NPL 1), discloses the following technique as a standard technology for PCI-Express, which is a specification for a general-purpose interface: When a PCI device transmits data to a processor, the PCI device attaches information indicating the expected frequency of reference and the characteristics of data called transaction layer packet processing hint (TPH) to the data; the processor refers to the TPH and stores data determined that will be referenced with high frequency to a cache memory built in the processor.

CITATION LIST

Patent Literature

PTL 1: JP 2010-033125 A

Non-Patent Literature

NPL 1: PCI-SIG PCI-Express Base Specification Revision 3.0 (released on 10 Nov. 2010)

SUMMARY OF INVENTION

Technical Problem

To improve data transfer performance, a storage apparatus caches user data using a primary storage device. User data indicate data which a host computer creates and transfers to or from the storage apparatus. As the amount of data being transferred to or from the storage apparatus increases, accesses to the primary storage device increase so that the bandwidth of the primary storage device is consumed. Lack of the bandwidth of the primary storage device degrades the performance of the storage system.

In the efforts toward component integration and cost reduction, a storage apparatus may be configured with functions equipped in a general-purpose processor, such as a PCI-Express interface, a memory interface, a cluster-to-cluster connection interface, and a DMA function, instead of a dedicated LSI. In a storage apparatus including multiple clusters, restrictions to the functions of a general-purpose processor do not allow direct access from a host interface or drive interface in a cluster to a primary storage device in a different cluster.

In this circumstance, one method of accessing a cache area in a cluster from a host interface or a drive interface in another cluster provides two-stage communication using primary storage devices included in the individual clusters: the first stage is a communication from the host interface or the drive interface to the primary storage device in the same cluster and the second stage is a communication from the primary storage device to the primary storage device in the different cluster. This technique, however, consumes considerable amounts of the bandwidths of the primary storage devices, resulting in degradation in data transfer performance of the storage apparatus.

TPH has been known as a solution to reduce the bandwidth consumption of a primary storage device. However, the capacity of a typical cache installed in a processor is 10 or 20 MB at most, which is not close to being enough for the capacity required for the cache function in a storage apparatus, several gigabytes at least.

Solution to Problem

A representative aspect of this invention is a storage system including a plurality of non-volatile storage devices for storing user data, and a controller for controlling data transfer between the plurality of non-volatile storage devices and a host computer. The controller includes a processor core circuit, a processor cache, and a primary storage device including a cache area for temporarily storing user data. The processor core circuit ascertains contents of a command received from the host computer. The processor core circuit ascertains a retention storage device of data to be transferred in the storage system in operations responsive to the command. The processor core circuit determines whether to transfer the data via the processor cache in the storage system, based on a type of the command and the ascertained retention storage device.

Advantageous Effects of Invention

The representative aspect of this invention enables a primary storage device to save bandwidth consumption in caching user data in a storage system to prevent degradation in data transfer performance.

DESCRIPTION OF EMBODIMENTS

The example explained hereinafter uses a processor cache in a storage apparatus as a transfer buffer in data transfer between a host frontend and a backend, and furthermore, as a transfer buffer in data transfer between clusters to save bandwidth consumption in a primary storage device. This configuration improves performance of the storage apparatus. Hereinafter, an embodiment of this invention will be described with reference to the accompanying drawings. It should be noted that this embodiment is merely an example to embody this invention and does not limit the technical scope of this invention.

Figure 1:
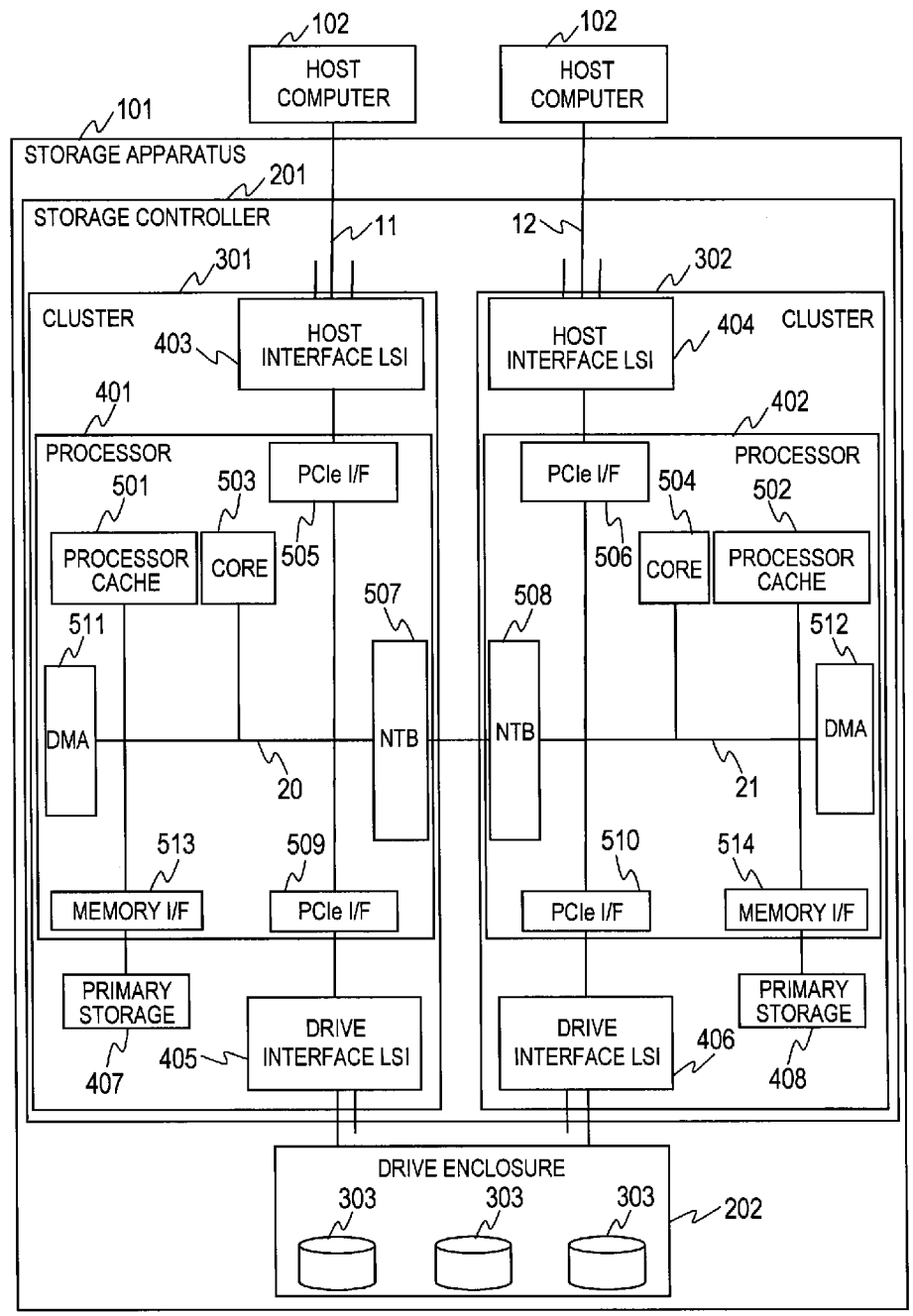
FIG. 1 schematically illustrates a configuration of a computer system in an embodiment of this invention, including a storage apparatus and host computers using the storage apparatus.

FIG. 1 illustrates a configuration example of a computer system including a storage apparatus 101, which provides a storage system, and a host computer 102 that accesses the storage apparatus 101. The computer system includes the host computer 102 for processing data and performing arithmetical operation and the storage apparatus 101. The storage apparatus 101 includes a storage controller 201 and a drive enclosure 202 for enclosing a storage drive (also referred to as a drive) 303, which is a non-volatile storage device for storing user data.

The number of host computers 102 may be either one or more than one. The numbers of the storage controllers 201, the drive enclosures 202, and the drives 303 each depend on the design. The drive 303 may be any kind of drive; for example, it could be a hard disk drive (HDD) or a solid state drive (SSD) including a non-volatile memory such as a flash memory.

The drive 303 includes a non-volatile storage medium to store user data transferred from a host computer 102 and redundant data calculated and generated by a core 503 or DMA 511. For example, a plurality of drives 303 is configured a RAID for data redundancy to prevent data loss in the case of a failure in any of the drives 303.

The storage apparatus 101 connects to host computers 102 with data transfer channels 11 and 12 by, for example, Fibre Channel (FC) or iSCSI. A storage controller 201 includes a plurality of clusters, two clusters 301 and 302 in this example. The cluster 301 includes a host interface LSI 403 of a device for connecting to a host computer 102, a drive interface LSI 405 of a device for connecting to (the drives 303 enclosed in) the drive enclosure 202, a processor 401 for performing internal processing, and a primary storage device 407 connected to the processor 401.

The cluster 302 includes a host interface LSI 404 of a device for connecting to a host computer 102, a drive interface LSI 406 of a device for connecting to the drive enclosure 202, a processor 402 for performing internal processing, and a primary storage device 408 connected to the processor 402. The two clusters 301 and 302 are interconnected with PCI-Express (PCIe), which is a high-speed serial general-purpose interface. The general-purpose interface connecting the clusters 301 and 302 depends on the design.

The host interface LSI 403 in the cluster 301 and the host interface LSI 404 in the cluster 302 have a function to convert a protocol used in communication between the host computer 102 and the storage controller 201, such as FC, Fibre Channel over Ethernet (FCoE), or iSCSI, into the PCIe protocol used inside the storage controller 201.

The drive interface LSI 405 in the cluster 301 and the drive interface LSI 406 in the cluster 302 have a function to convert a protocol used in communication between the drives 303 and the storage controller 201, such as FC, Serial Attached SCSI (SAS), or Serial Advanced Technology Attachment (SATA), into the protocol used inside the storage controller 201, for example, PCIe.

As illustrated in FIG. 1, the clusters 301 and 302 have the same configuration. Hereinafter, the configuration of the cluster 301 will be described more specifically. The primary storage device 407 is a storage device including a semiconductor memory such as a Double Data Rate Synchronous DRAM. The primary storage device 407 temporality stores data read or written by the host computer 102 (caching user data) or stores data handled by the processor 401 for performing internal processing and programs for controlling the storage controller 201.

The processor 401 includes a core 503 for executing arithmetic operations and read/write of data to control the storage controller 201, a processor cache 501, and a memory interface 513 for data transfer with the primary storage device 407. A core circuit in the processor can include one or more cores.

The processor cache 501 is a memory located between the primary storage device 407 and the processor core 503 and positioned as the upper hierarchy memory than the primary storage device 407. An access (read or write) from the processor core 503 to the processor cache 501 is faster than an access to the primary storage device 407. Typically, the processor cache 501 is composed of an SRAM or an eDRAM and is built in the processor chip.

In typical, the processor cache 501 is divided into a plurality of hierarchies. In this embodiment, the processor cache 501 temporarily stores control information data for the storage controller 201 and, in addition, temporarily stores user data read or written by the host computer 102 (user data caching). The processor core 503 reads data from or writes data to the primary storage device 407 via the processor cache 501.

The processor 401 further includes a PCIe interface 505 for connecting the processor 401 to the host interface LSI 403, a PCIe interface 509 for connecting the processor 401 to the drive interface LSI 405, a direct memory access (DMA) 511 which is a controller for data transfer between the primary storage device 407 in the particular cluster of the subject (also referred to as a local cluster) 301 and the other cluster (also referred to as a remote cluster) 302, and a non-transparent bridge (NTB) 507 to be a communication interface with the remote cluster 302.

The internal components in the processor 401 are interconnected with an internal network 20. The processor cache 501 retains part of the data in the address space operated by the processor 401. The remaining data is retained in the primary storage device 407.

Figure 2:
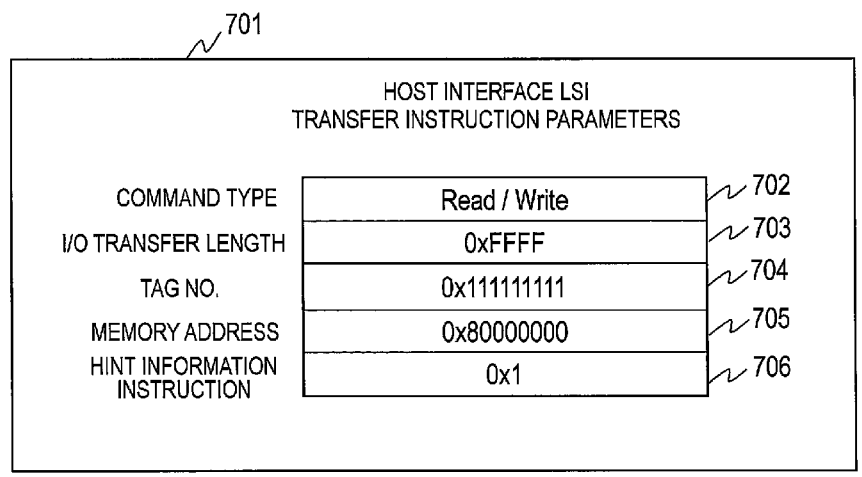
FIG. 2 illustrates contents of an instruction from a processor to a host interface LSI in the embodiment.

FIG. 2 shows exemplary contents of an instruction (host interface LSI transfer instruction parameters 701) for the processor 401 or 402 to instruct the host interface LSI 403 or 404, respectively, to transfer data. This instruction is issued to the host interface LSI 403 or 404 respectively by the processor 401 or 402, in responding to a command (read command/write command) from the host computer 102.

The processor 401 or 402 (processor core 503 or 504) analyzes the command received from the host computer 102 and creates this instruction including the transfer instruction parameters 701. The command includes information on the command type, the address of user data (a volume managed by the host computer and the address in the volume), and the transfer length of the transfer data.

The transfer instruction parameters 701 include command control information 702 indicating the type of the instruction from the processor 401 or 402, an I/O transfer length 703 indicating the transfer length of the transfer data, a tag number 704 of an identifier of the command from the host computer 102, a memory address 705 indicating the address in the primary storage device 407 or 408 in the storage controller 201, and an instruction 706 indicating whether to attach hint information (TPH: transaction layer packet processing hint) to the transfer data in executing the data transfer.

Figure 3:
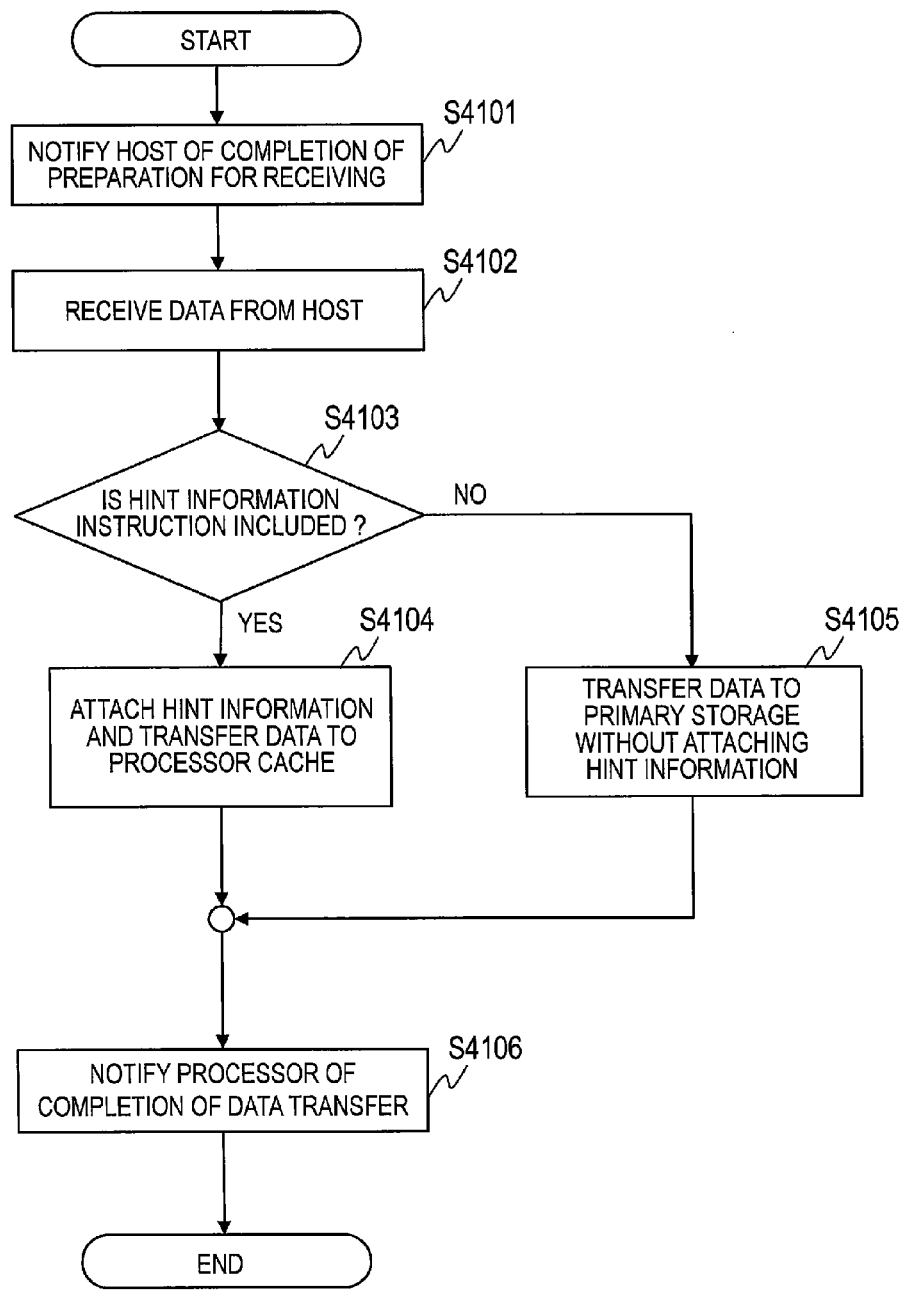
FIG. 3 illustrates operations of the host interface LSI in the embodiment to process a write request from a host computer.

FIG. 3 is a flowchart illustrating operations of the host interface LSI 403 or 404 upon receipt of an instruction for write command processing from its respective processor 401 or 402. Hereinafter, processing of the host interface LSI 403 will be explained by way of example.

Upon receipt of transfer instruction parameters 701 from the processor 401, the host interface LSI 403 notifies the host computer 102 of completion of preparation to receive write data (user data) (S4101) and then, receives the write data from the host computer 102 (S4102).

Next, the host interface LSI 403 ascertains whether the host interface LSI transfer instruction parameters 701 include a hint information attached instruction 706 (S4103). If they include a hint information attached instruction (YES at S4103), the host interface LSI 403 attaches hint information indicating that the data will be referenced in a short time to the packet including user data received from the host computer 102 and sends it to the processor 401 (S4104).

The processor 401 that has received the packet ascertains that the hint information is attached to the user data. Then the processor 401 stores the received user data to the processor cache 501. Specifically, the PCIe interface (I/F) 505 determines whether hint information has been attached to the received user data and, if hint information has been attached, it transfers the user data to the processor cache 501. The (controller of the) processor cache 501 stores the received data to the address calculated from the memory address 705.

On the other hand, if attachment of hint information is not instructed (NO at S4103), the host interface LSI 403 does not attach hint information to the received user data and sends the data to the processor 401 (S4105).

The processor 401 that has received the data ascertains that no hint information has been attached and stores the received data to the primary storage device 407. Specifically, the PCIe I/F 505 determines whether hint information has been attached to the received user data and, if there is no hint information, it transfers the user data to the primary storage device 407 via the memory I/F 513. Finally, the host interface LSI 403 notifies the processor 401 of the completion of the data transfer (S4106) to terminate processing.

Figure 4:
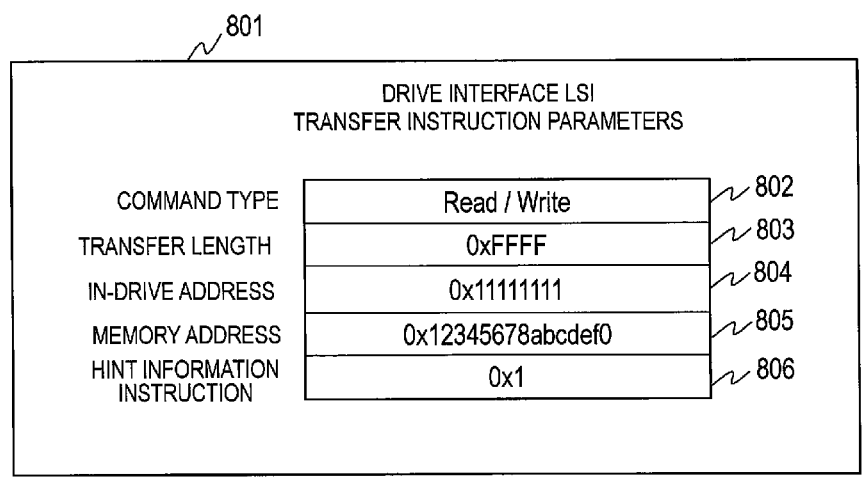
FIG. 4 illustrates contents of an instruction from a processor to a drive interface LSI in the embodiment.

FIG. 4 shows exemplary contents of an instruction (drive interface LSI transfer instruction parameters 801) for the processor 401 or 402 to instruct the drive interface LSI 405 or 406, respectively, to transfer data. This instruction is issued to the drive interface LSI 405 or 406, respectively by the processor 401 or 402, in requesting a drive 303 for a read/write. Like the instruction 701 to the host interface LSI 403, the processor 401 or 402 creates a transfer instruction including these transfer instruction parameters 801 from a command received from the host computer 102.

The transfer instruction parameters 801 include command control information 802 indicating the type of the instruction from the processor 401 or 402, a transfer length 803 indicating the transfer length of the transfer data, an in-drive address 804 indicating the address (physical address) of data located in a drive 303, a memory address 805 indicating the address in the primary storage device 407 or 408 in the storage controller 201 for the drive interface LSI 405 or 406 to execute the data transfer, and an instruction 806 indicating whether to attach hint information to the transfer data in executing the data transfer.

Figure 5:
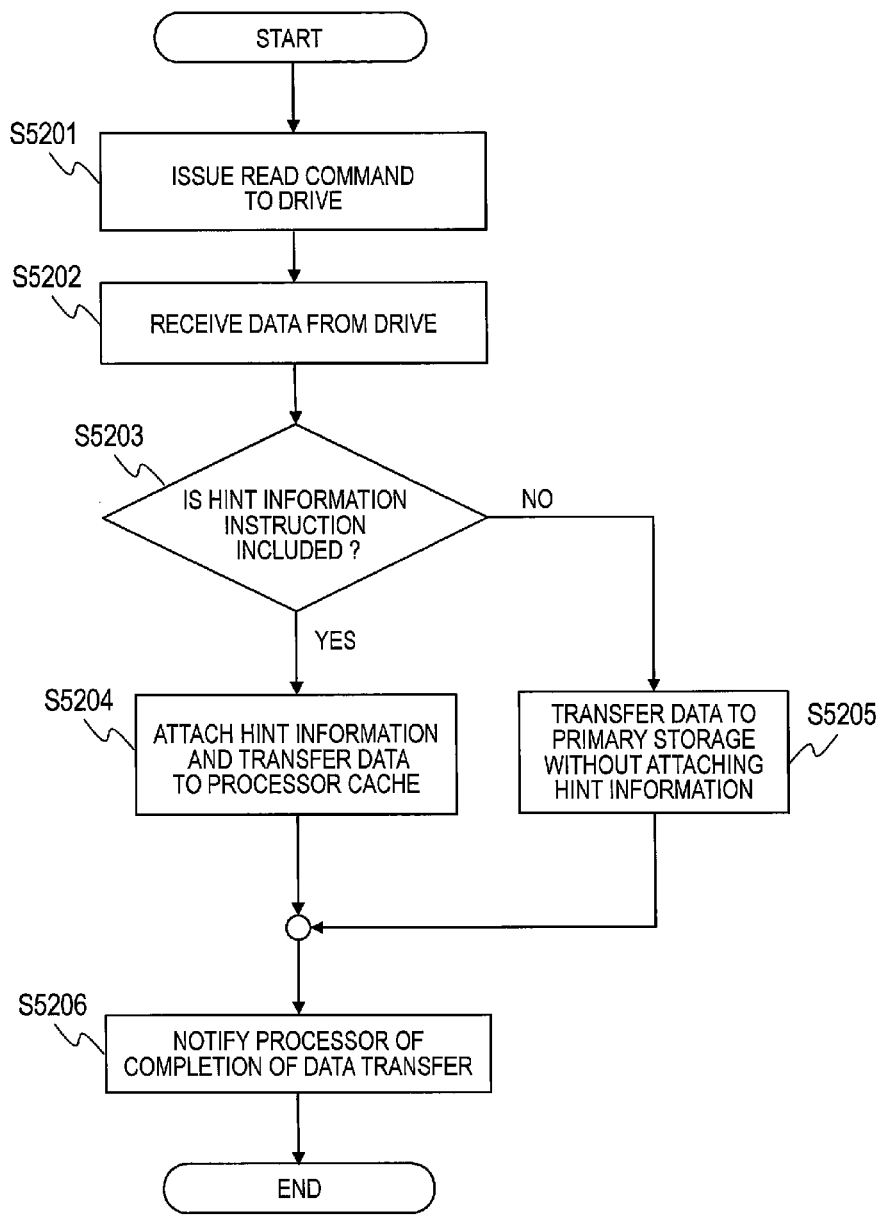
FIG. 5 illustrates operations of the drive interface LSI in the embodiment to perform a read from a storage drive.

FIG. 5 is a flowchart illustrating operations of the drive interface LSI 405 or 406 upon receipt of an instruction for a read from its respective processor 401 or 402. Hereinafter, processing of the drive interface LSI 405 will be explained by way of example.

Upon receipt of a transfer instruction including transfer instruction parameters 801 from the processor 401, the drive interface LSI 405 issues a read command to a drive 303 and instructs the drive 303 to transfer user data (S5201). Next, the drive interface LSI 405 receives user data in accordance with the instruction from the drive 303 (S5202).

Next, the drive interface LSI 405 ascertains whether the drive interface LSI transfer instruction parameters 801 include a hint information attached instruction 806 (S5203). If they include a hint information attached instruction (YES at S5203), the drive interface LSI 405 attaches hint information indicating that the data will be referenced in a short time to the packet including the retrieved user data and sends it to the processor 401 (S5204).

The processor 401 that has received the packet ascertains that the hint information is with the user data and stores the received user data to the processor cache 501. Specifically, the PCIe I/F 509 determines whether hint information has been attached to the received user data and, if hint information has been attached, it transfers the user data to the processor cache 501. The (controller of the) processor cache 501 stores the received user data to the address obtained from the memory address 805.

On the other hand, if attachment of hint information is not instructed (NO at S5203), the drive interface LSI 405 does not attach hint information and sends the user data received from the drive 303 to the processor 401 (S5205).

The processor 401 that has received the user data ascertains that no hint information has been attached and stores the received data to the primary storage device 407. Specifically, the PCIe I/F 509 determines whether hint information has been attached to the received user data and, if there is no hint information, it transfers the user data to the primary storage device 407 via the memory I/F 513. Finally, the drive interface LSI 405 notifies the processor 401 of the completion of the data transfer (S5206) to terminate the processing.

Figure 6:
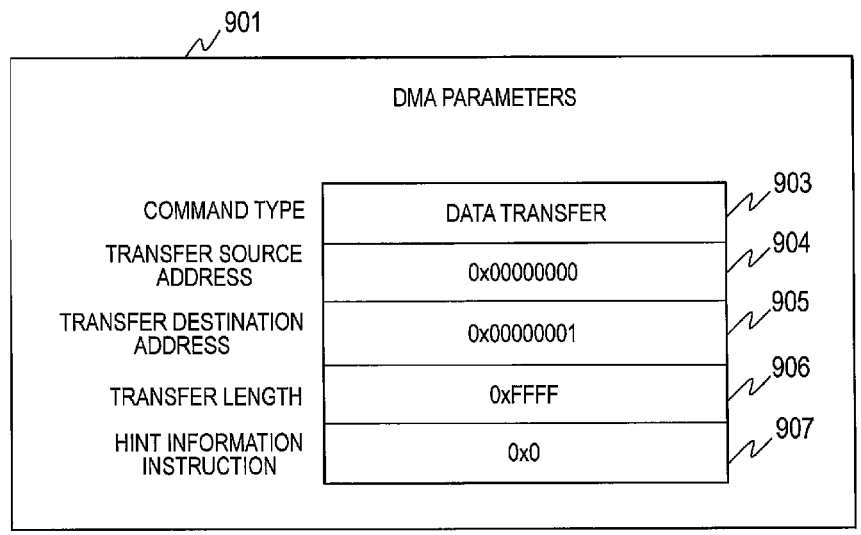
FIG. 6 illustrates contents of instructions from a processor to a DMA in the embodiment.
Figure 6:
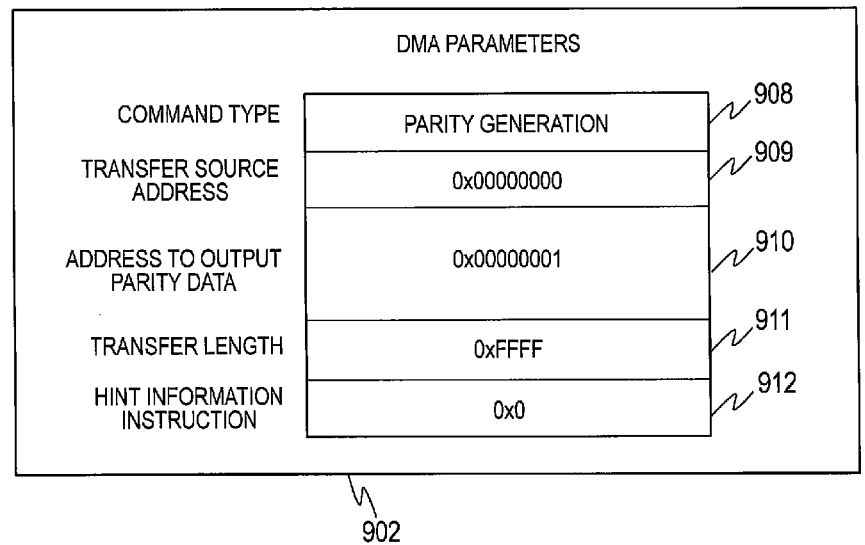

FIG. 6 shows exemplary contents of instructions (DMA parameters) for the processor core 503 or 504 to instruct the DMA 511 or 512, respectively, to transfer data and generate parity data. The contents of two kinds of instructions are provided in this example. One is data transfer DMA parameters 901 for data transfer. In the following description, an example of data transfer from a cluster to another will be explained. The other example is DMA parameters 902 for parity generation to calculate RAID parity.

When a processor core instructs a DMA in a different cluster (remote cluster), the processor core sends a request to instruct the DMA to the remote cluster together with the instruction contents. The processor core in the remote cluster that has received them instructs the DMA in the remote cluster in accordance with the foregoing instruction contents.

An instruction for data transfer is used in transferring data in the primary storage device or the processor cache to the primary storage device or the processor cache in a different cluster. An instruction for parity generation is used in generating parity data based on data in the primary storage device or the processor cache in the same cluster as the DMA that has received the transfer instruction and storing the generated parity data in the primary storage device or the processor cache in the same cluster.

In the case of DMA parameters 901 for data transfer, the instruction includes a command type 903, a transfer source address 904 of transfer data, a transfer destination address 905 of the transfer data, the transfer length 906 of the transfer data, and a hint information attachment instruction 907 indicating whether to attach hint information in the transfer. The addresses 904 and 905 are addresses in the primary storage device.

In the case of DMA parameters 902 for parity generation, the instruction includes a command type 908, an address 909 of source data for parity generation, an address 910 to output the generated parity data, the transfer length 911 indicating the size of the generated parity data, and a hint information attachment instruction 912 indicating whether to attach hint information in the transfer. The addresses 909 and 910 are addresses in the primary storage device.

Figure 7:
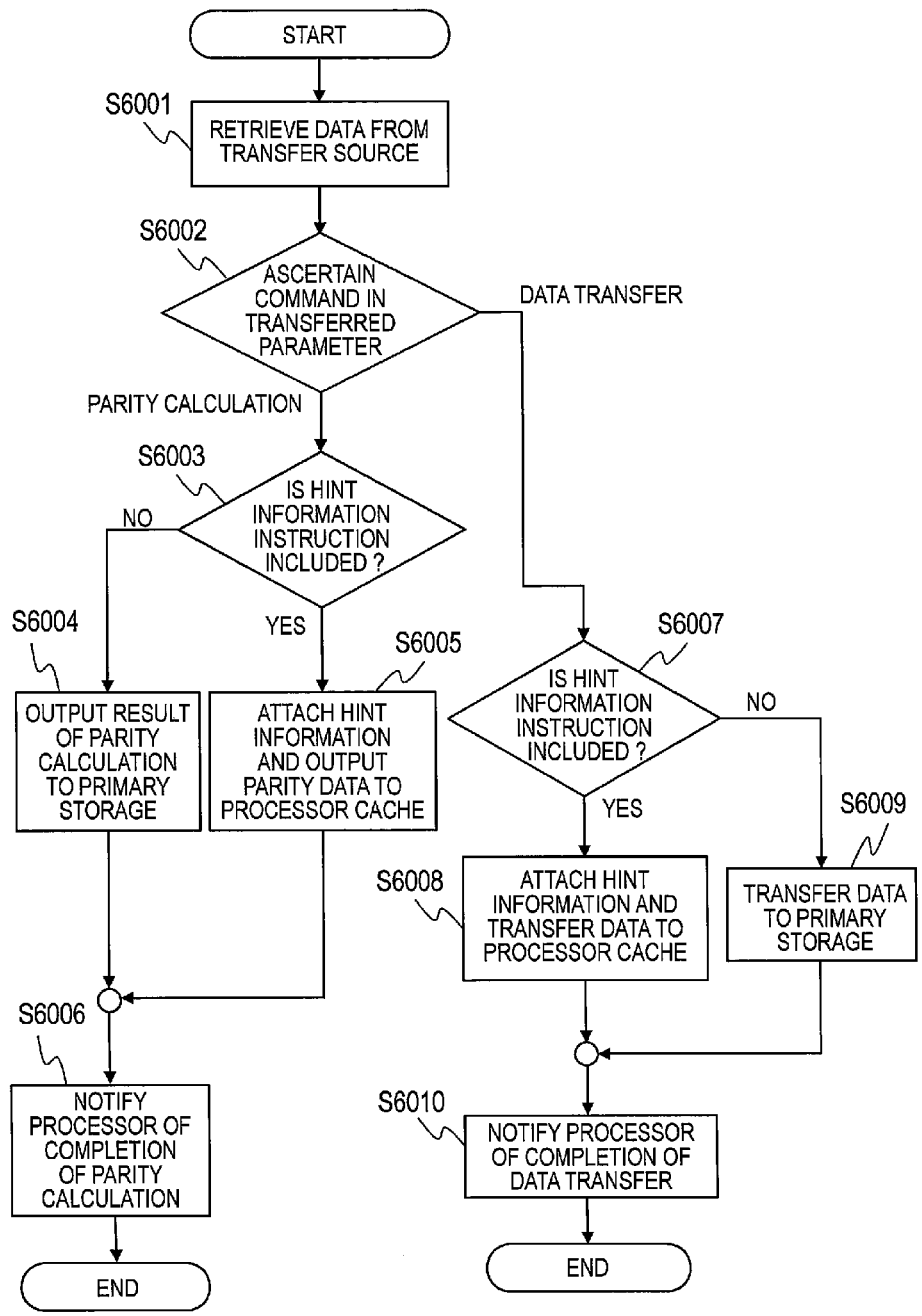
FIG. 7 illustrates operations of the DMA in the embodiment when the DMA receives an instruction from the processor.

FIG. 7 is a flowchart illustrating operations of the DMA 511 or 512 upon receipt of an instruction from its respective processor 401 or 402. Hereinafter, processing of the DMA 511 will be explained by way of example. As mentioned above, the DMA receives an instruction of the remote processor via the local processor (the processor in the same cluster as the DMA).

First, the DMA 511 retrieves data from the specified transfer source address 905/909 with reference to the DMA parameters 901/902 received from the processor 401 (S6001). Next, the DMA 511 determines the type of operation with reference to the field of the command type 903/908 in the received parameters 901/902 (S6002).

If the type of operation is parity generation (PARITY CALCULATION at S6002), the DMA 511 ascertains whether the field of hint information instruction 912 indicates attachment of hint information (S6003). If it indicates attachment of hint information (YES at S6003), the DMA 511 generates parity data (a result of parity calculation), attaches hint information to it, and outputs it with address information (S6005). The controller of the processor cache 501 that has received the outputted data and detected the attached hint information stores the received parity data to the address determined by the transfer destination address 905.

On the other hand, if the field of hint information attachment instruction 912 does not indicate attachment of hint information (NO at S6003), the DMA 511 outputs a result of parity calculation together with address information without attaching hint information (S6004). Upon receipt of the output data, the memory I/F 513 ascertains that hint information has not been attached and stores the received parity data to the address in the primary storage device 407 determined by the transfer destination address 905. The DMA 511 notifies the processor 401 of the completion of the parity generation (S6006) to terminate the processing.

Back to the step S6002, if the type of operation is data transfer (DATA TRANSFER at S6002), the DMA 511 ascertains whether the field of hint information instruction 907 indicates attachment of hint information (S6007). If it indicates attachment of hint information (YES at S6007), the DMA 511 attaches hint information to data to be transferred and outputs the data to the processor 402 in the remote cluster 302 via the NTB 507 (S6008).

The NTB 508 in the remote cluster ascertains that the transferred data includes hint information and transfers the data to the processor cache 502. The processor cache 502 stores the transferred data to the specified address.

On the other hand, if the field of hint information instruction 907 does not indicate attachment of hint information (NO at S6007), the DMA 511 outputs data to be transferred to the processor 402 in the remote cluster 302 via the NTB 507 without attaching hint information to the data (S6009). The NTB 508 in the remote cluster 302 ascertains that the transferred data does not include hint information and transfers the data to the primary storage device 408 via the memory I/F 514. Then, the DMA 511 notifies the processor 401 of the completion of the data transfer (S6010) to terminate the processing.

Figure 8:
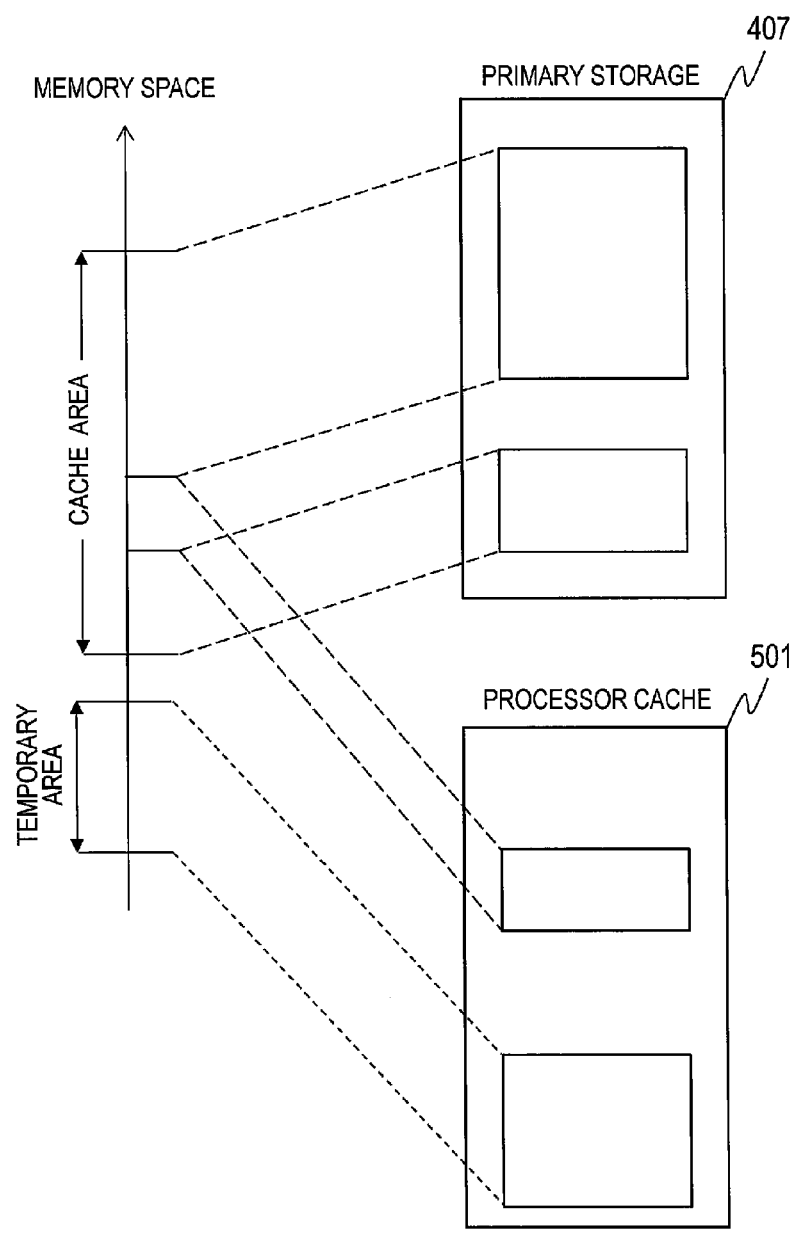
FIG. 8 illustrates relations between the processor cache and the primary storage device and the memory space in this embodiment.

FIG. 8 illustrates an exemplary relationship between the primary storage device 407 and the processor cache 501 in the cluster 301 and a memory space. The relationship between the primary storage device 408 and the processor cache 502 in the cluster 302 and a memory space is the same, but the relationship may be different depending on the cluster.

The area for storing user data to be read or written by the host computer 102 is separated into a cache area and a temporary area. The cache area stores data which will not be referenced in a short time but should be retained for a long time, for example, data which is more likely to be referenced again. To be referenced again in the primary storage device, data held in the cache area in the processor cache 501 is flushed out into the primary storage device 407 in accordance with an instruction of the processor core 503 or 504. The temporary area stores data which will be referenced in a short time. To avoid data from being referenced again in the primary storage device 407, data stored in the temporary area in the processor cache 501 is overwritten in a short time. Since accesses to data referenced in a short time are gathered at the processor cache 501, the frequency of access to the processor cache 501 increases.

Such data allocation results in higher access frequency to the processor cache 501 and lower access frequency to the primary storage device 407. Since the temporary area is rewritten in a short time, accesses to the primary storage device 407 can be saved with a limited capacity of the processor cache.

In this example, the processor cache 501 covers the whole temporary area and further includes part of the cache area. The rest of the cache area is included in the primary storage device 407. The processor cache 501 does not need to have any cache area at all.

In a configuration where the cache area consists of areas of both the processor cache 501 and the primary storage device 407 like this example, the processor 401 may use either the cache area of the processor cache 501 or the cache area of the primary storage device 407 depending on the attributes of the data, locational information of the data, or the combination of them. For example, if the data length is longer than a given threshold, the processor 401 may store the data to the primary storage device 407, but if the data length is equal to or shorter than the threshold, it may store the data to the processor cache 501. Alternatively, if the data transfer source storage device is a HDD, the processor 401 may store the data in the primary storage device 407, but if a SSD, it may store the data in the processor cache 501.

The processor 401 releases an area of the processor cache 501 holding data which has been referenced and is less likely to be referenced again, and uses the area to store different data. The processor 401 flushes data which will not be referenced again in a short time but will be or is more likely to be referenced again later from the processor cache 501 out to place it into the primary storage device 407. The area of the processor cache 501 after the data move is used to store other data. This operation reduces the occupancy rate in the processor cache 501 and the accesses to the primary storage device 407.

Figure 9:
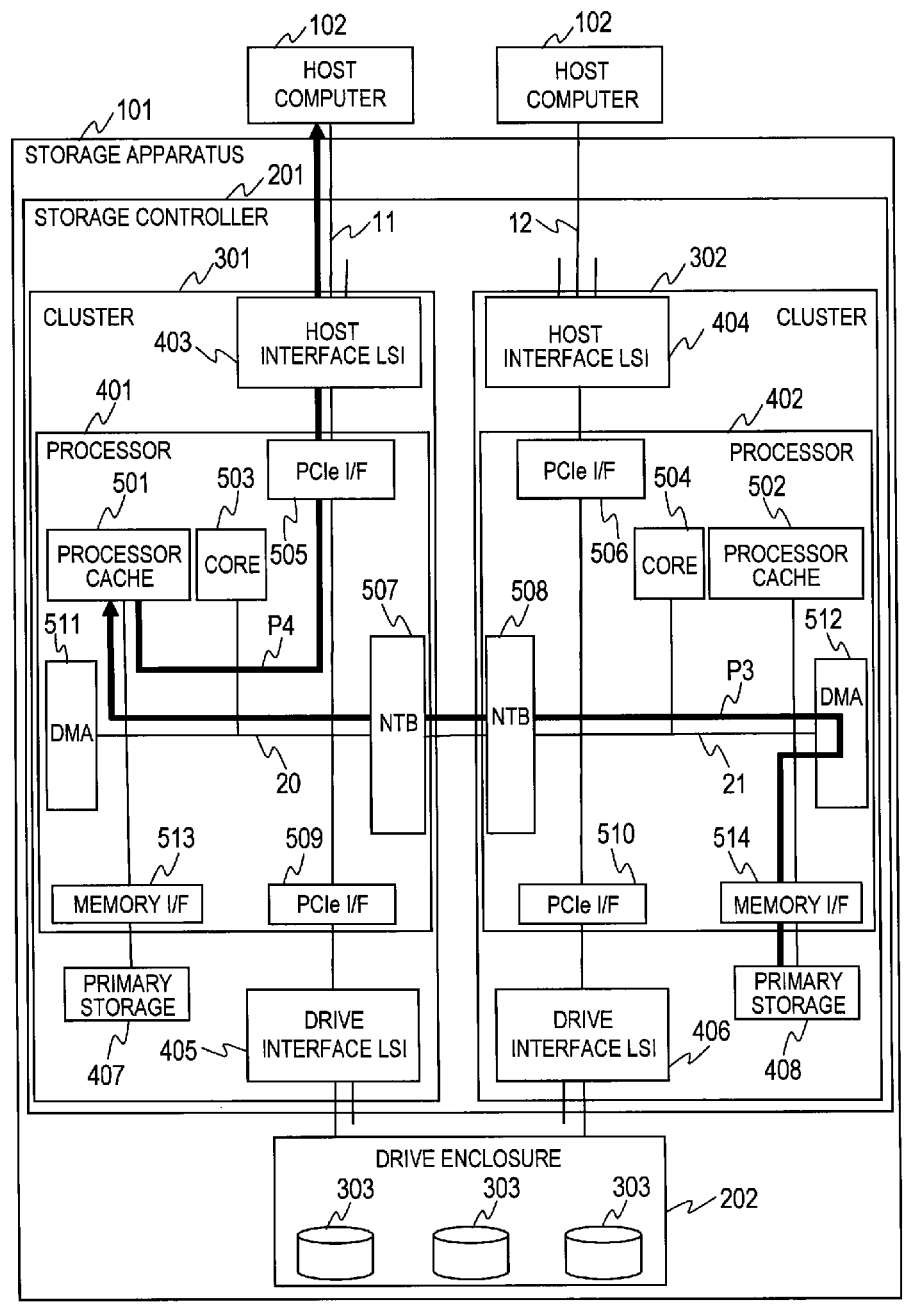
FIG. 9 illustrates flow of data transferred in the embodiment in the case where data designated by a read command of a host computer is in a cache area of another cluster.

FIG. 9 illustrates flow of data transferred in the case where the cluster 301 receives a read command from the host computer 102 and the designated user data is in the primary storage device 408 in a different cluster (remote cluster) 302.

The DMA 512 in the remote cluster 302 transfers the data in the primary storage device 408 in the cluster 302 to the cluster 301 which is connected to the host computer 102. This transfer data is to be referenced immediately. Hence, the DMA 512 attaches hint information indicating that the data will be referenced in a short time and transfers the data to the processor cache 501 via the NTBs 508 and 507 (P3).

Next, the host interface LSI 403 sends the data in the processor cache 501 to the host computer 102 (P4). After Sending the data, the host interface LSI 403 notifies the host computer 102 of the completion of sending the data. This finishes the response for the read request of the host computer 102. The use of the processor cache 501 can save the accesses to the primary storage device 407, so that the performance of the storage apparatus 101 improves.

Figure 10:
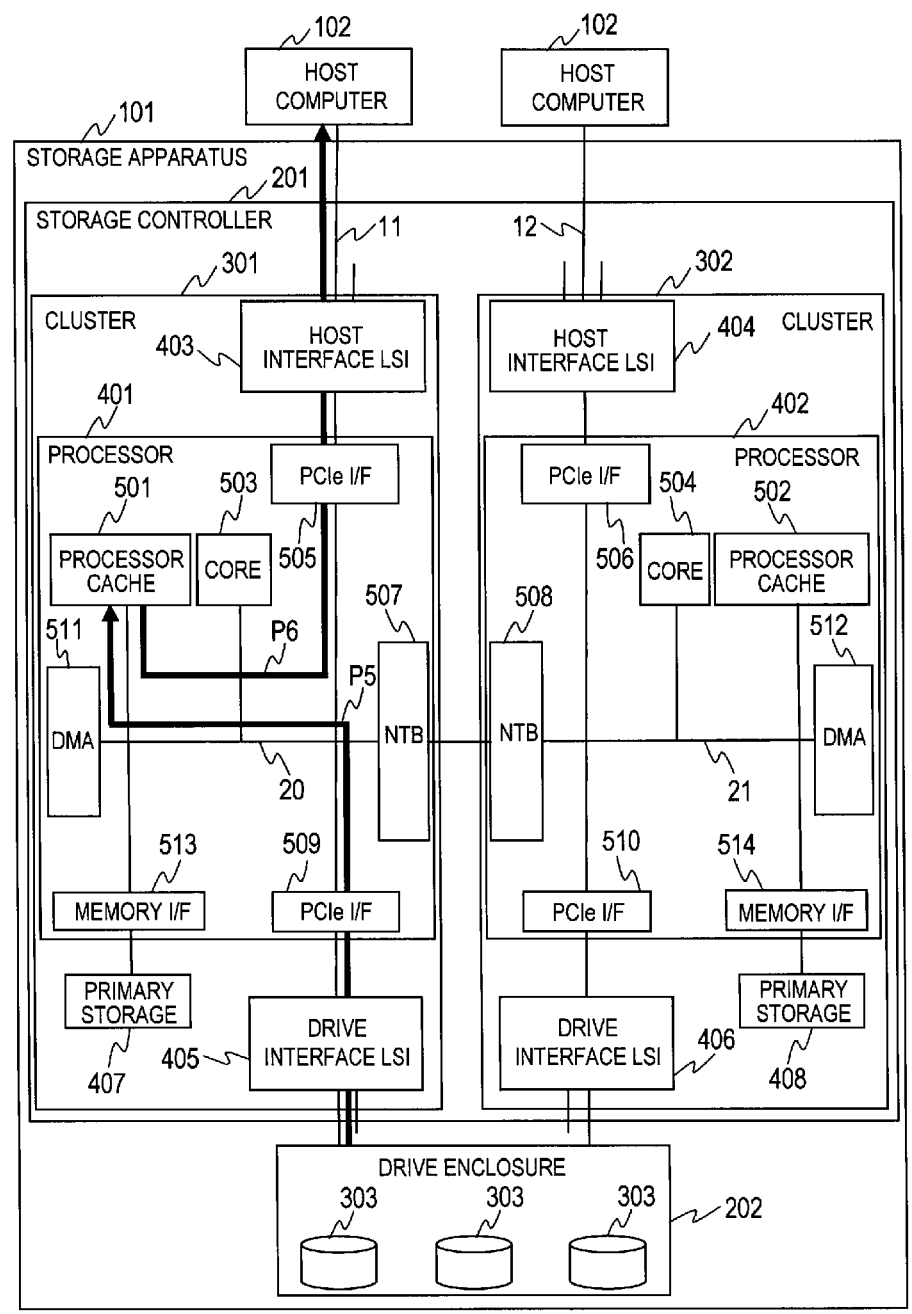
FIG. 10 illustrates flow of data transferred in the embodiment in the case where data designated by a read command from a host computer is not in a cache area.

FIG. 10 illustrates flow of data in the case where the cluster 301 receives a read command from the host computer 102 and retrieves the designated user data from a non-volatile semiconductor storage device (SSD) since the data is not in the primary storage device. First, the drive interface LSI 405 retrieves data in a drive 303 (P5).

The retrieved data is immediately referenced by the host interface LSI 403. The drive interface LSI 405 attaches hint information indicating that the data will be referenced in a short time and transfers the data to the processor cache 501 via the PCIe 509. The subsequent flow is the same as the flow denoted by P4 in FIG. 9 (P6).

Figure 11:
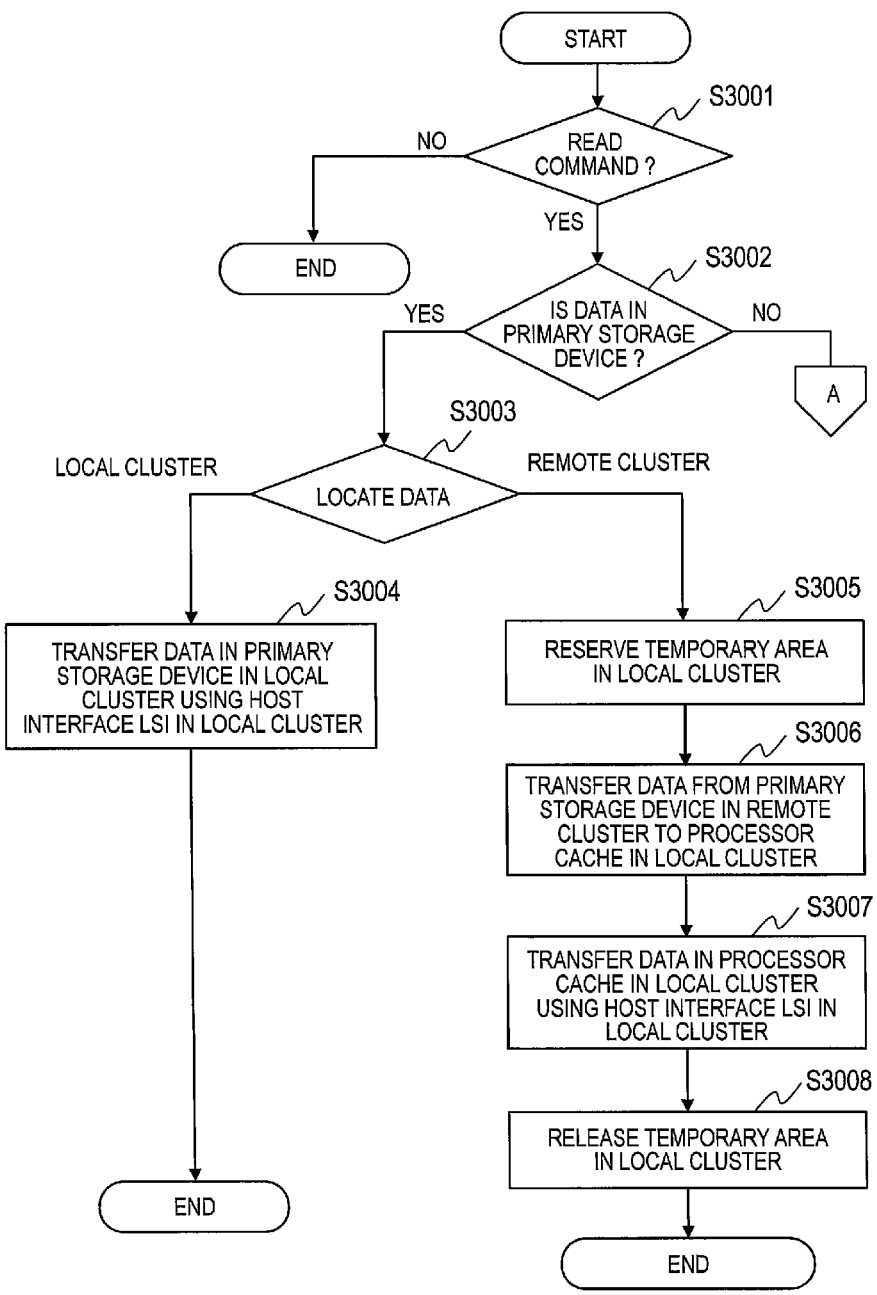
FIG. 11 is a flowchart of the embodiment upon receipt of a read command from the host computer.
Figure 12:
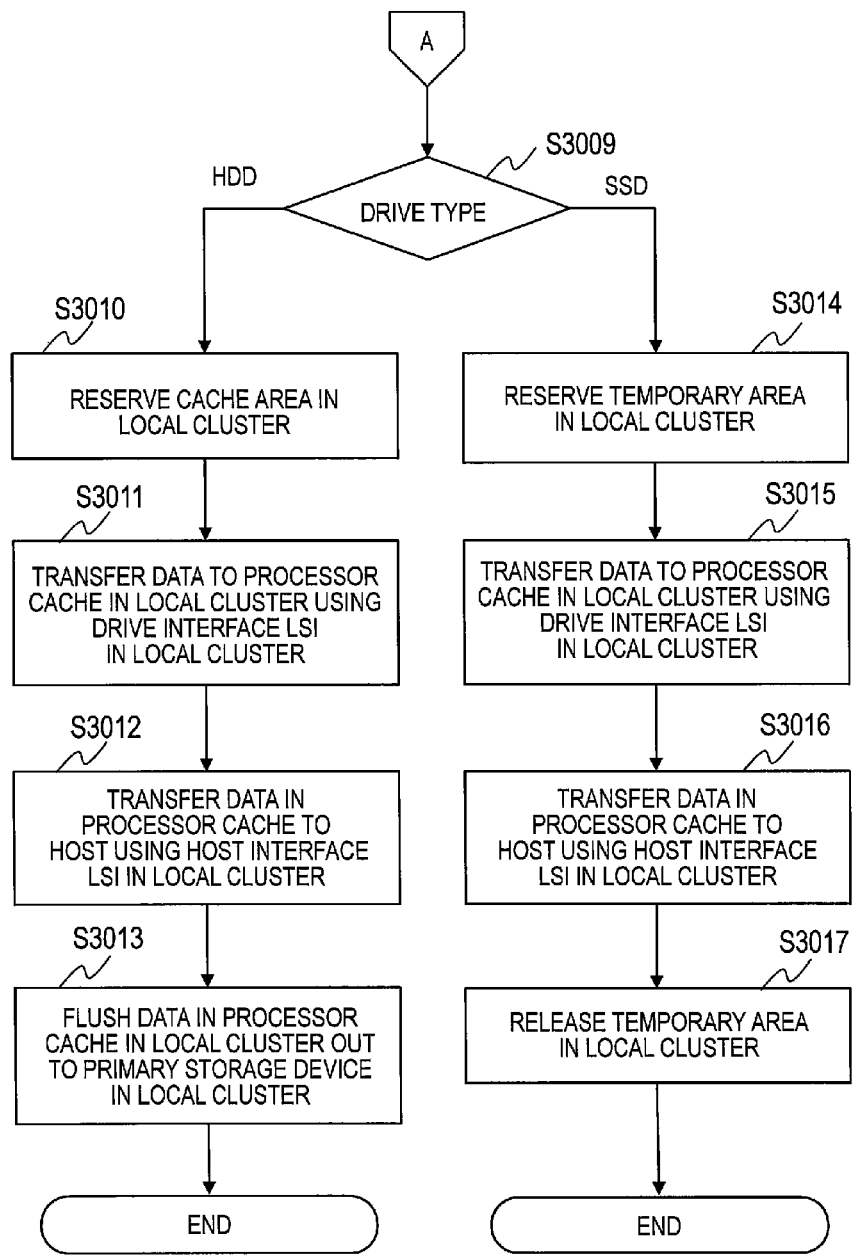
FIG. 12 is a flowchart of the embodiment upon receipt of a read command from the host computer.

FIGS. 11 and 12 are flowcharts illustrating operations of a processor upon receipt of a read command from a host computer 102. The following description is provided assuming that the processor 401 receives a read command from the host computer 102.

As indicated in FIG. 11, upon receipt of a read command from the host computer 102 via the host interface LSI 403 and the PCIe I/F 505, the processor core 503 determines the command type (S3001). In this flow, the processor core 503 determines that the received command is a read command. The processor core 503 determines whether the user data at the address specified by the command is present in a primary storage device which has already been retrieved from the drive 303 with referencing to cache management information (not shown) (S3002).

If the designated data is present in a primary storage device (YES at S3002, refer to FIG. 9 for the flow of data transfer), the processor core 503 determines to which cluster 301 or 302 the primary storage device containing the designated user data belongs with reference to the cache management information and locates the designated user data (S3003).

If the processor core 503 determination is the local cluster 301, which means it is present in the primary storage device 407 in the cluster 301 connected to the host computer 102 that has issued the command (LOCAL CLUSTER at S3003), the processor core 503 transfers the data to the host computer 102 (S3004) and terminates the processing.

Specifically, the host interface LSI 403 that has received an instruction from the processor core 503 retrieves the user data in the primary storage device 407 via the PCIe I/F 505 and transfers it to the host computer 102.

If, at step S3003, the processor core 503 determination is the remote cluster 302, which means it is present in the primary storage device 408 in the cluster 302 which is not connected to the host computer 102 that has issued the command, the storage controller 201 cannot transfer the data in the primary storage device 408 directly to the host computer 102.

Accordingly, the processor core 503 first reserves a temporary area in the processor cache 501 in the local cluster 301 (S3005). Next, the processor core 503 transfers the data from the primary storage device 408 in the remote cluster 302 to the local cluster 301 using the DMA 512 in the remote cluster 302.

The transferred data is referenced immediately in the local cluster 301. Hence, the processor core 503 instructs the DMA 512 in the remote cluster 302 to attach hint information to the designated user data and transfer it. The user data with hint information is transferred from the NTB 508 to the NTB 507. The NTB 507 checks the hint information and transfers the data to the processor cache 501 (S3006). The transferred user data is stored in the reserved area in the processor cache 501.

Subsequently, the processor core 503 transfers the user data from the processor cache 501 to the host computer 102 using the host interface LSI 403 (S3007). Since the data in the reserved temporary area in the processor cache 501 becomes unnecessary after this transfer, the processor core 503 releases the reserved area (S3008) and terminates the processing.

Back to the step S3002, if the user data at the specified address is not present in a primary storage device (NO at S3002), the processor core 503 retrieves the user data from the drive 303 and transfers it to the host computer 102 as indicated in FIG. 12. In this case, the processor core 503 determines whether the type of the drive holding the user data is HDD or SSD with reference to volume data management information (not shown) (S3009). The volume data management information manages storage locations (including volumes and their addresses) of data designated by the host computer 102 in relation to the types of the drives holding the data at the addresses.

If the user data is held in an HDD (HDD at S3009), it is preferable that the retrieved user data is held in the primary storage device 407 after the data is transferred to the host computer 102 in preparation to the next access to the same data because the response speed of HDDs is slower than that of SSDs. For this reason, the processor core 503 reserves a cache area in the primary storage device 407 in the local cluster 301 to hold the user data after the transfer thereof to the host computer 102 (S3010).

The processor core 503 retrieves the user data from the drive 303 using the drive interface LSI 405 (S3011). The retrieved user data is immediately referenced for the transfer to the host computer 102. Hence, the processor core 503 instructs the drive interface LSI 405 to attach hint information to the designated user data and transfer it. The PCIe I/F 509 transfers the user data to the processor cache 501 in accordance with the hint information attached to the user data.

Then, the processor core 503 transfers the user data in the processor cache 501 to the host computer 102 with the host interface LSI 403 (S3012). This user data will not be referenced until receipt of another read command from the host computer 102. Then, the processor core 503 operates to flush the data out into the primary storage device (S3013). These operations prevent the processor cache 501 from being kept occupied by data which is not referenced.

If the user data is held in an SSD (SSD at S3009, refer to FIG. 10 for the flow of data transfer), it is preferable not to retain the user data in the primary storage device 407 but to use the particular area for other data because the response speed of SSDs is fast.

For this reason, the processor core 503 reserves a temporary area to store the user data in the processor cache 501 in the local cluster 301 (S3014).

Next, the processor core 503 retrieves the user data from the drive 303 using the drive interface LSI 405 (S3015). The processor core 503 instructs the drive interface LSI 405 to attach hint information to the user data and transfer it. The PCIe I/F 509 transfers the user data to the processor cache 501 in accordance with the hint information attached to the user data. The specified address of the transfer destination is a temporary area reserved at step S3014 and the controller of the processor cache 501 stores the user data there.

Then, the processor core 503 transfers the user data in the processor cache 501 to the host computer 102 with the host interface LSI 403 (S3016). Thereafter, the processor core 503 releases the temporary area in the processor cache 501 holding the user data (S3017).

Figure 13:
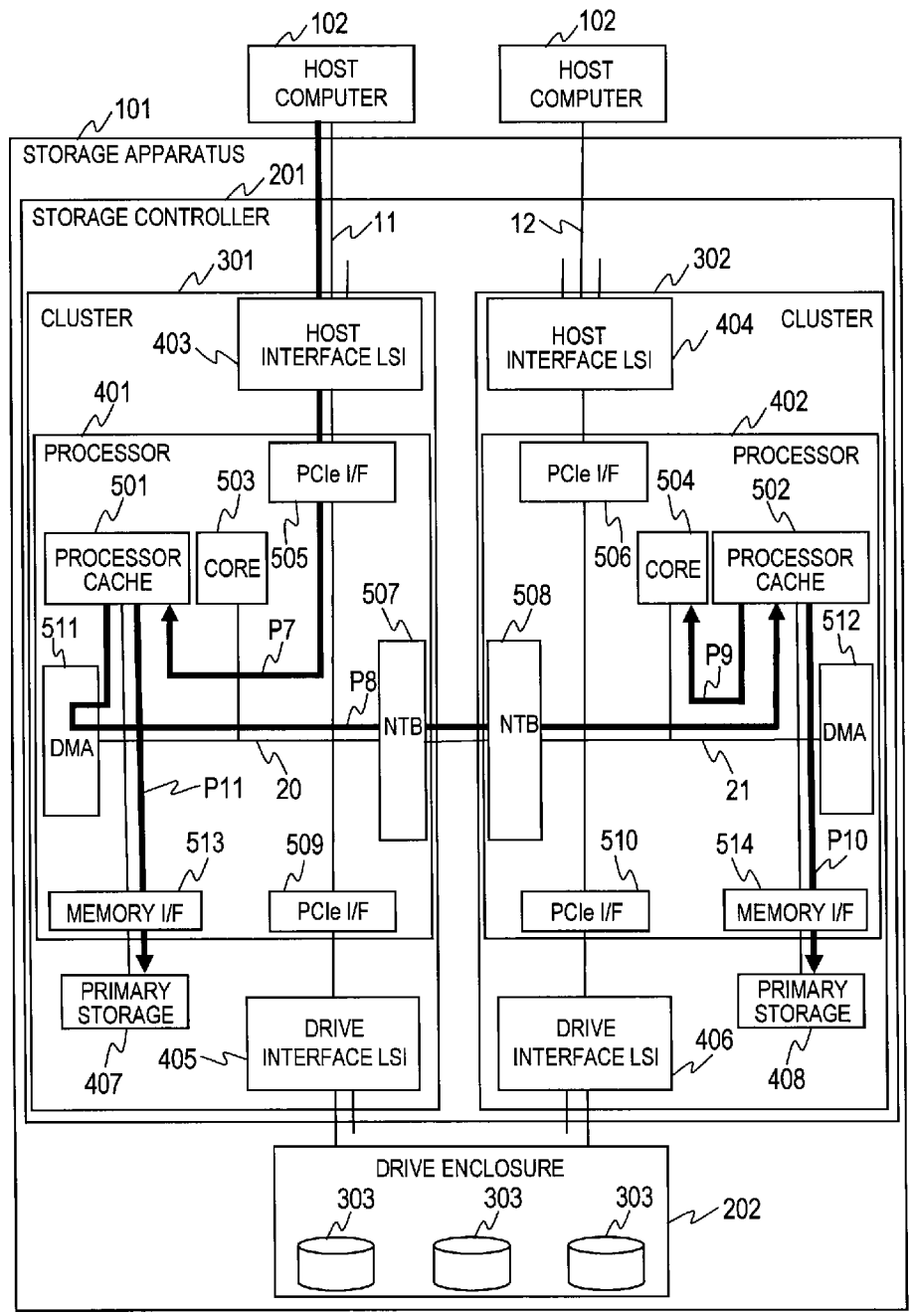
FIG. 13 illustrates data transfer flow in the embodiment upon receipt of a write command from the host computer until duplication of data to the both clusters.

FIG. 13 illustrates flow of data transferred after receipt of a write command from a host computer 102 until cluster 301 finishes the duplication of the received user data in the primary storage devices 407 and 408 in both of the clusters 301 and 302 (frontend write).

The host interface LSI 403 receives write data (user data) from the host computer 102. The received user data is to be referenced immediately for duplication. Hence, the host interface LSI 403 stores the user data to the processor cache 501 with hint information indicating that the user data will be referenced in a short time (P7).

Next, to prevent data loss because of a hardware failure, the DMA 511 transfers the data in the processor cache 501 to the remote cluster 302. The remote cluster 302 of the destination checks whether the data has no corruption using a error detection code called data integrity field (DIF).

The DMA 511 attaches hint information indicating that the data will be referenced in a short time to the data and transfers the data to the processor cache 502 in the remote cluster 302 (P8). Next, the processor core 504 in the remote cluster 302 verifies the error detection code (P9).

Since the user data will not be accessed until it is written to the drive 303, the processor cores 503 and 504 flush the user data from the respective processor caches 501 and 502 out into the respective primary storage devices 407 and 408 (P10, P11).

Figure 14:
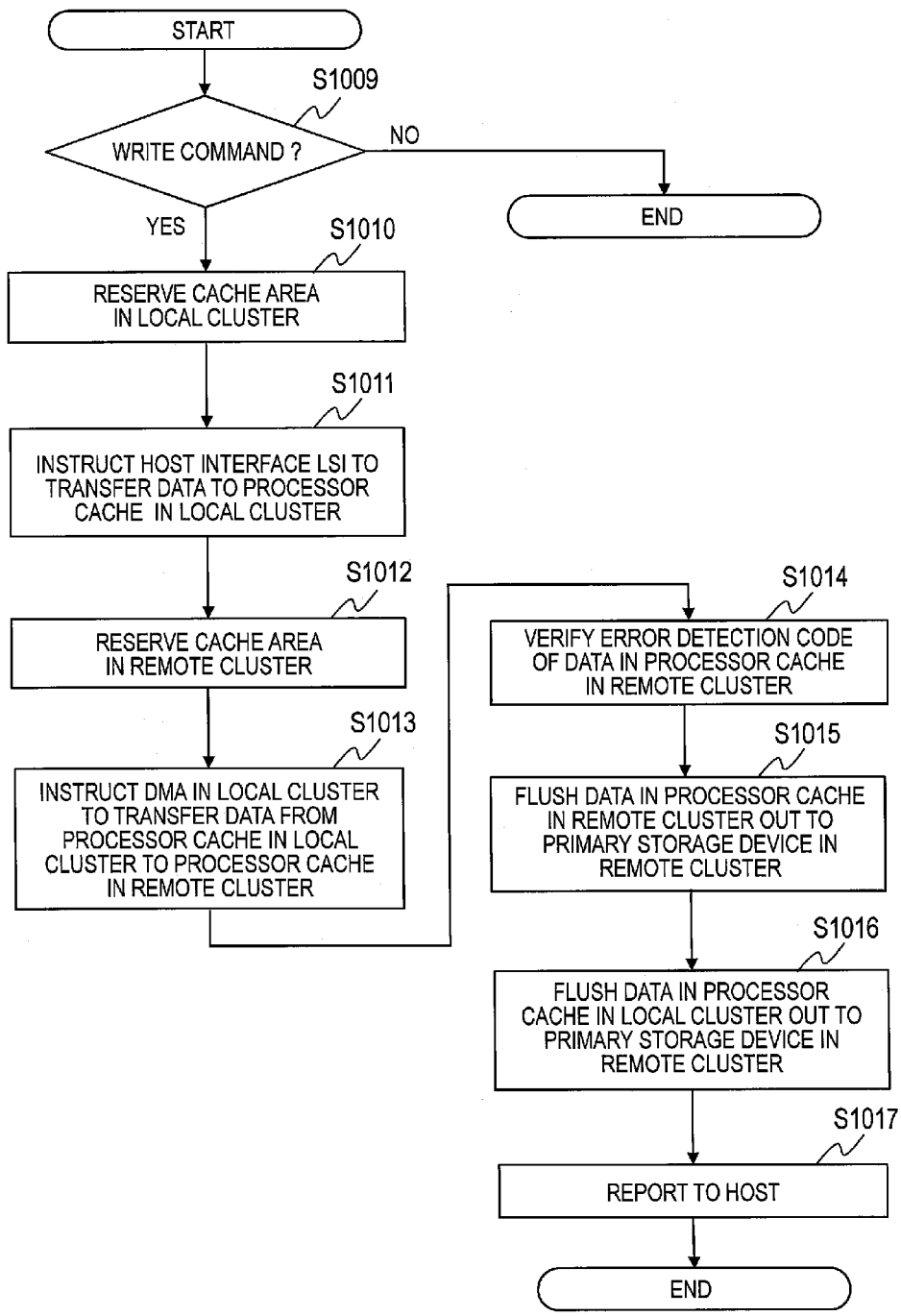
FIG. 14 is a flowchart for the processor in the embodiment, upon receipt of a write command from the host computer until duplication of data to the both clusters.

FIG. 14 is a flowchart illustrating operations of the processors 401 and 402 upon receipt of a write command from a host computer 102 (frontend write). The following description is about operations in the flowchart, assuming that the cluster 301 has received a write command.

Upon receipt of a write command from the host computer 102 via the host interface LSI 403 and the PCIe I/F 505, the processor core 503 determines the type of the command (S1009). In this flow, the processor core 503 determines that the received command is a write command.

Next, the processor core 503 reserves a cache area in the local cluster 301 (S1010). In this example, it reserves a cache area in the primary storage device 407. Then, the processor core 503 instructs the host interface LSI 403 to write (transfer) the user data received from the host computer 102 (S1011). The transfer user data is referenced immediately for duplication in the remote cluster 302. Hence, the processor core 503 instructs the host interface LSI 403 to attach hint information to the data and transfer the data.

Next, the processor core 503 reserves a cache area in the remote cluster 302 (S1012). In this example, it reserves a cache area in the primary storage device 408. The processor core 503 instructs the processor core 504 in the remote cluster 302 to reserve a cache area in the primary storage device 408.

Next, the processor core 503 instructs the DMA 511 in the local cluster 301 to transfer the user data in the processor cache 501 in the local cluster 301 to the remote cluster 302 (S1013). The user data transferred to the remote cluster 302 is referenced immediately for verification of the error detection code. Hence, the processor core 503 instructs the DMA 511 to attach hint information to the data and transfer the data.

The data with hint information is transferred to the NTB 508 via the NTB 507. The NTB 508 checks the hint information in the transferred data and transfers the data to the processor cache 502. The controller of the processor cache 502 stores the received data to the address in the processor cache 502 corresponding to the specified address in the primary storage device 408. The processor core 504 in the remote cluster 302 verifies the error detection code of the transferred user data (S1014).

The data will not be read in a short time in both of the local cluster 301 and the remote cluster 302. Hence, the processor core 504 in the remote cluster 302 flushes the data out from the processor cache 502 to the primary storage device 408 (S1015) and the processor core 503 in the local cluster 301 flushes the data out from the processor cache 501 to the primary storage device 407 (S1016). Finally, the processor core 503 reports the completion of the write to the host computer 102 (S1017) to terminate the processing.

Figure 15:
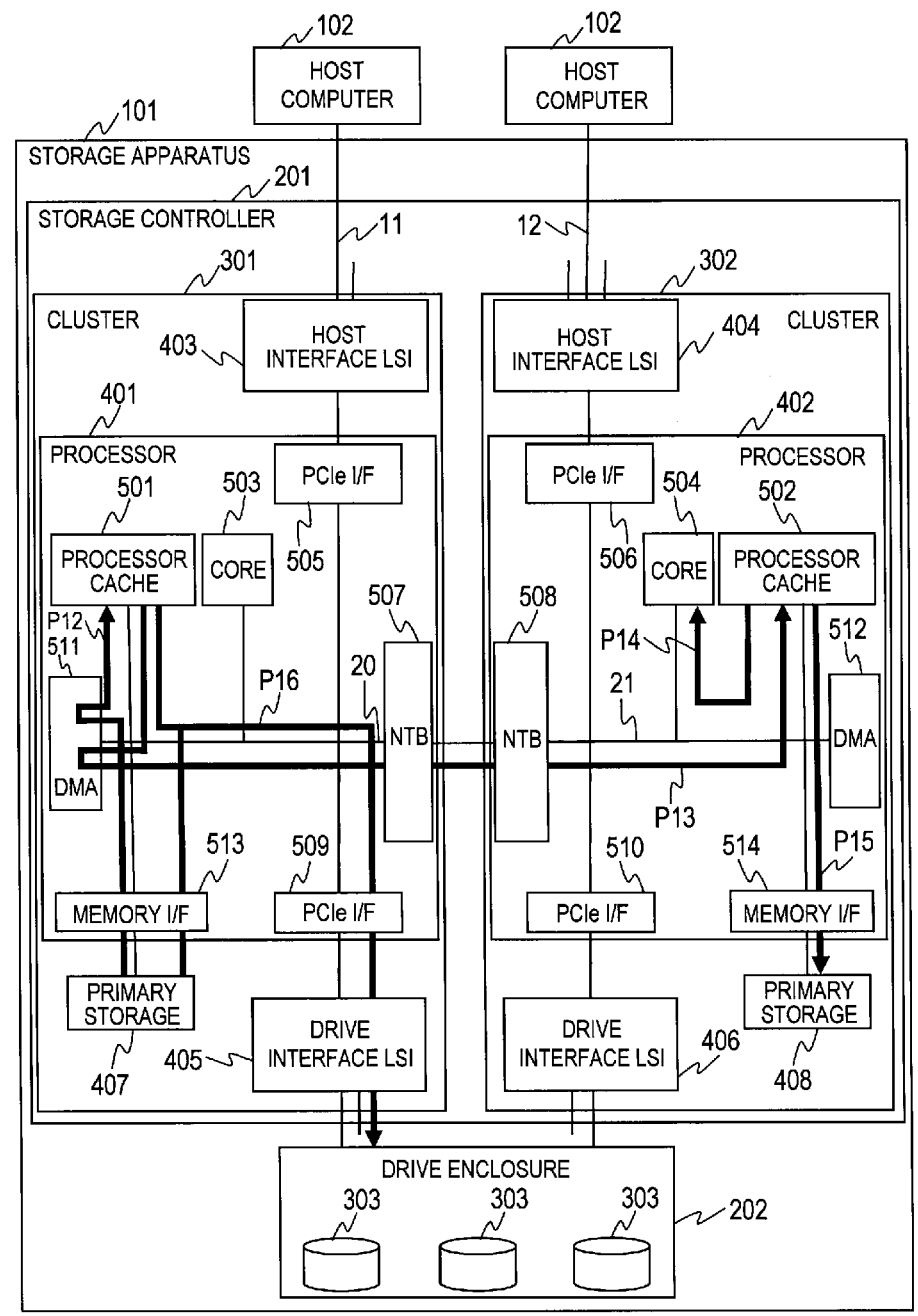
FIG. 15 illustrates data flow in the embodiment in generating parity data based on the written data and writing it to a storage drive in the case where the data written by the host computer is long.

FIG. 15 illustrates flow of data transfer that RAID parity data is generated with the user data written by the host computer and retained in the primary storage device and to write the user data written by the host computer 102 and transfers the generated parity data to a drive 303 (backend write). This description is about a case where the user data written by the host computer 102 is long enough to calculate parity data only from the written user data.

First, the DMA 511 generates parity data based on the user data written by the host computer 102 (P12). The generated parity data is referenced immediately for duplication. Accordingly, the DMA 511 attaches hint information indicating that the data will be referenced in a short time to the parity data and stores it to the processor cache 501.

Next, the DMA 511 transfers the parity data in the processor cache 501 to the remote cluster 302 to prevent data loss because of a hardware failure. The transferred data is referenced immediately for verification of the error detection code at the transfer destination. Accordingly, the DMA 511 attaches hint information indicating that the data will be referenced in a short time to the data and transfers the data to the processor cache 502 in the remote cluster 302 (P13). Then, the processor core 504 in the remote cluster 302 verifies the error detection code of the parity data generated and transferred by the DMA 511 (P14).

The data will not be referenced unless a hardware failure occurs. Hence, the processor core 504 in the remote cluster 302 flushes the data out from the processor cache 502 to the primary storage device 408 (P15). Finally, the drive interface LSI 405 writes the user data written by the host computer 102 and the generated parity data to the drive 303 (P16).

Figure 16:
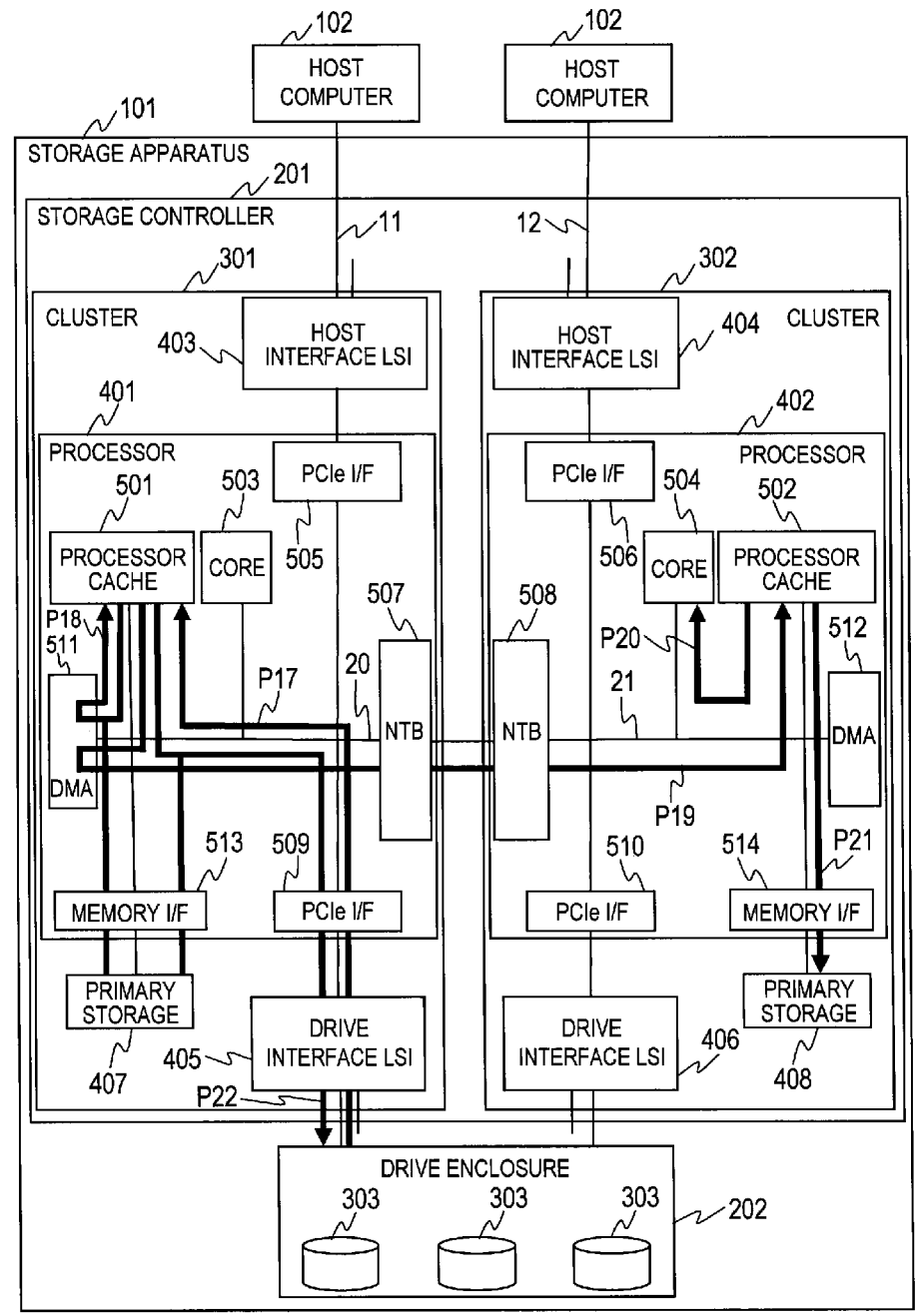
FIG. 16 illustrates data flow in the embodiment in generating parity data based on the written data and data retained in a storage drive and writing it to a storage drive in the case where the data written by the host computer is short.

FIG. 16 illustrates flow of data transfer in which RAID parity data is updated with the user data written by the host computer 102 in the primary storage device and the data retained in a drive 303 and the user data written by the host computer 102 and the updated RAID parity data is transferred to a drive 303 (backend write). This description is about a case where the user data written by the host computer 102 is too small to calculate parity data only from the written user data.

First, the drive interface LSI 405 retrieves current parity data and current user data, which are required to update the parity data. These are used (referenced) immediately after the retrieval to update parity data. Accordingly, the drive interface LSI 405 attaches hint information indicating that the data will be referenced in a short time to the retrieved current parity data and current user data and stores them to the processor cache 501 (P17).

The DMA 511 generates parity data based on the user data written by the host computer 102 and the current parity data and user data retrieved from the drive 303 (P18). The generated parity data is referenced immediately for duplication. Accordingly, the DMA 511 attaches hint information indicating that the data will be referenced in a short time to the generated party data and stores it to the processor cache 501.

Next, the DMA 511 transfers the parity data in the processor cache 501 to the remote cluster 302 to prevent data loss because of a hardware failure. The transferred data is referenced immediately at the transfer destination for verification of the error detection code. Accordingly, the DMA 511 attaches hint information indicating that the data will be referenced in a short time and transfers the data to the processor cache 502 in the remote cluster 302 (P19).

Then, the processor core 504 in the remote cluster 302 verifies the parity data generated and transferred by the DMA 511 with the error detection code (P20). The data will not be referenced unless a hardware failure occurs. Hence, the processor core 504 in the remote cluster 302 flushes the data out from the processor cache 502 to the primary storage device 408 (P21). Finally, the drive interface LSI 405 writes the user data written by the host computer 102 and the generated parity data to a drive 303 (P22).

Figure 17:
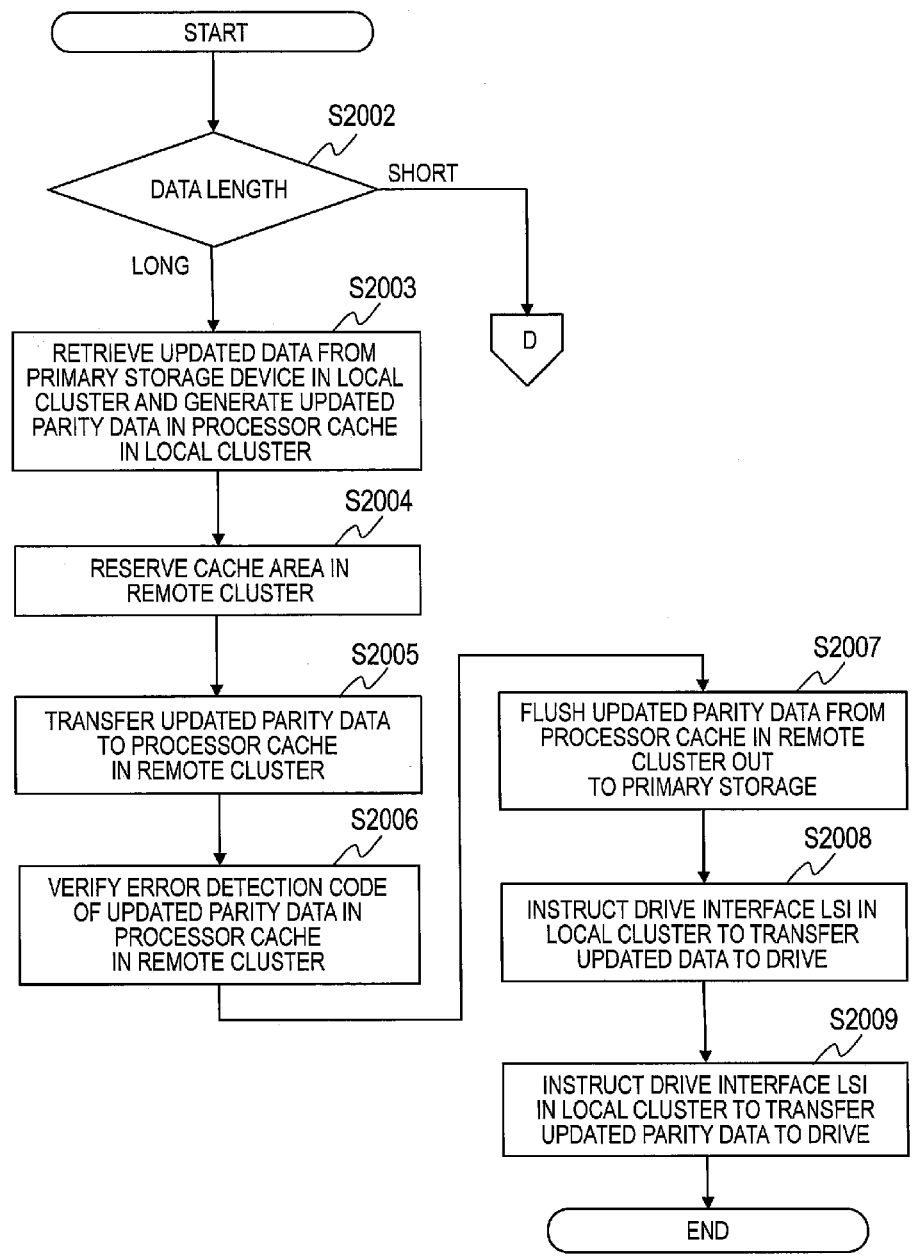
FIG. 17 is a flowchart of the embodiment to store write data retained in the primary storage device or the processor cache to a storage drive.
Figure 18:
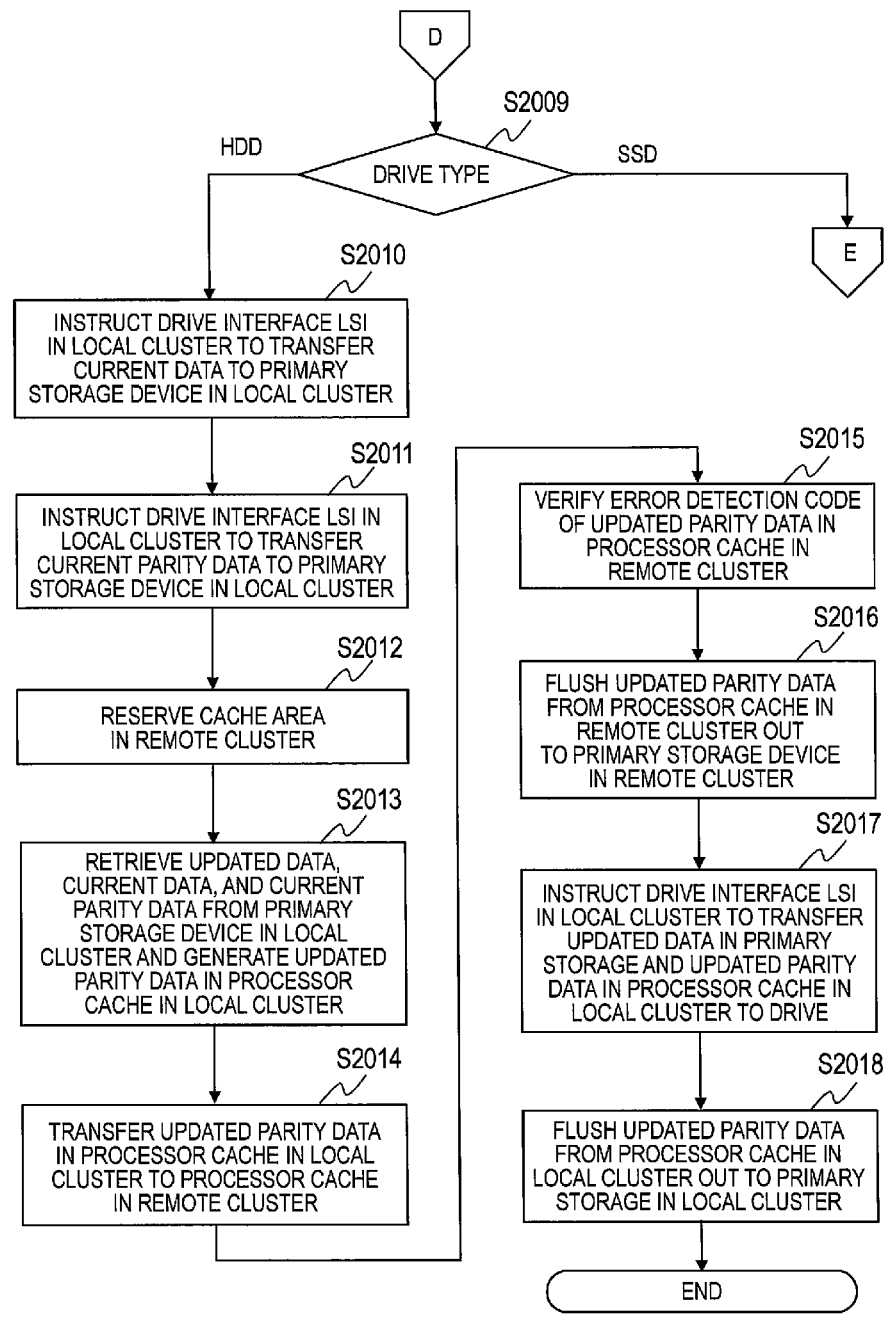
FIG. 18 is a flowchart of the embodiment to store write data retained in the primary storage device to a storage drive.
Figure 19:
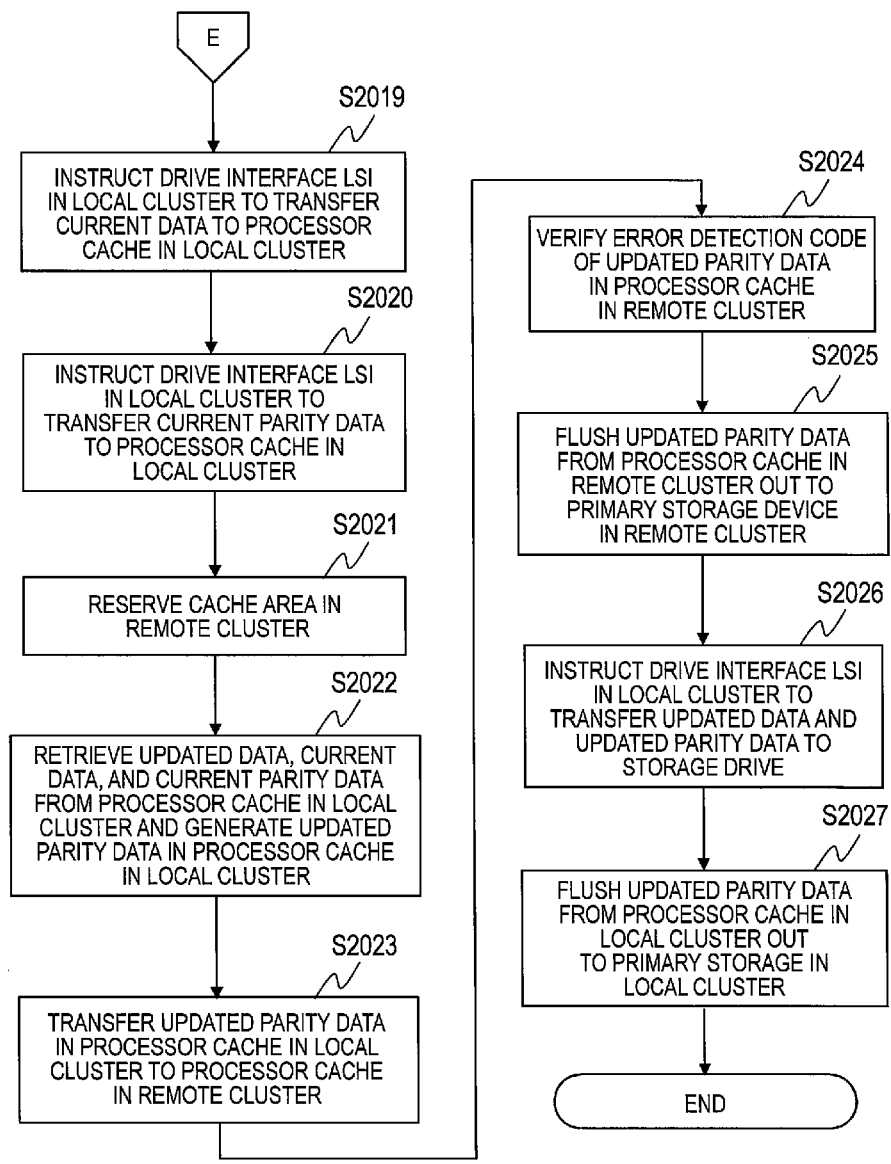
FIG. 19 is a flowchart in the embodiment to store write data retained in the processor cache to a storage drive.

FIGS. 17, 18, and 19 are flowcharts illustrating operations of a processor from generating parity data with user data written by a host computer 102 and stored in a primary storage device as appropriate to writing the user data and the parity data to a drive (backend write). The following description explains a process in accordance with the flowcharts, assuming that the cluster 301 has received a write command from a host computer 102.

The processor core 503 ascertains the data length of the updated user data (the user data received from the host computer 102) in the primary storage device 407 (S2002). If the data length is longer than a given threshold (LONG at S2002), the processor core 503 can generate parity data with the updated user data in the primary storage device 407.

Accordingly, the processor core 503 generates parity data using the DMA 511. Specifically, it instructs the DMA 511 to obtain the updated user data from the primary storage device 407 and generate updated parity data. The updated parity data is immediately transferred to the remote cluster 302 for duplication. The processor core 503 instructs the DMA 511 to generate the updated parity data with hint information and store it to the processor cache 501 (S2003).

The processor core 503 reserves a cache area in the remote cluster 302 (S2004). In this example, it reserves a cache area in the primary storage device 408. The processor core 503 instructs the processor core 504 in the remote cluster 302 to reserve a cache area. The processor core 504 reserves a cache area in the primary storage device 408 according to its instruction.

Next, the processor core 503 instructs the DMA 511 in the local cluster 301 to transfer the updated parity data in the processor cache 501 to the remote cluster 302 (S2005). The data transferred to the remote cluster 302 is immediately referenced for verification of the error detection code. Hence, the processor core 503 instructs the DMA 511 to attach hint information to the data and transfer the data.

The controller of the processor cache 502 stores the updated parity data received from the local cluster 301 at the address in the processor cache 502 corresponding to the specified address in the primary storage device 408. The processor core 504 in the remote cluster 302 verifies the error detection code of the updated parity data transferred to the processor cache 502 (S2006).

The parity data in the remote cluster 302 will not be referenced in a short time after it. Hence, the processor core 504 in the remote cluster 302 flushes the data out from the processor cache 502 to the primary storage device 408 (S2007). The updated parity data has been duplicated in the clusters 301 and 302.

The processor core 503 in the local cluster 301 instructs the drive interface LSI 405 in the local cluster 301 to transfer the updated user data to the drive 303 (S2008) and the updated parity data to the drive 303 (S2009). The processor terminates the processing.

Back to the step S2002, if the data length of the updated user data in the primary storage device 407 is equal to or shorter than the threshold (SHORT at S2002), the processor core 503 determines, as indicated in FIG. 18, whether the type of the drive 303 at the storage location (address) specified by the write command is HDD or SSD with reference to volume data management information (S2009).

If the specified storage location is an HDD (HDD at S2009), an access to the drive takes a long time and results in a long occupation of the processor cache 501. In addition, the bandwidth of the primary storage device 407 is relatively larger than the drive 303. Accordingly, as shown in FIG. 19, the processor 401 performs a write to the drive 303 using the primary storage device 407 instead of the processor cache 501.

Specifically, the processor core 503 instructs the drive interface LSI 405 to transfer the current user data to the primary storage device 407 (S2010). Furthermore, it instructs the drive interface LSI 405 to transfer the current parity data to the primary storage device 407 (S2011).

The processor core 503 reserves a cache area in the remote cluster 302 to store the updated parity data using the processor core 504 in the remote cluster 302 (S2012). In this example, it reserves a cache area in the primary storage device 408.

Next, the processor core 503 generates parity data with the current user data, current parity data, and the updated user data received from the host computer 102 using the DMA 511 in the local cluster 301 (S2013) to update current parity data. The updated parity data is immediately referenced for duplication in the remote cluster 302. Hence, the processor core 503 instructs the DMA 511 to write the updated parity data to the processor cache 501 with hint information.

Next, the processor core 503 instructs the DMA 511 to transfer the updated parity data in the processor cache 501 in the local cluster 301 to the remote cluster 302 (S2014). The data transferred to the remote cluster 302 is immediately referenced for the verification of the error detection code. Hence, the processor core 503 instructs the DMA 511 to attach hint information to the data and transfer the data. The controller of the processor cache 502 stores the received updated parity data at the address in the processor cache 502 corresponding to the specified address of the primary storage device 408.

Next, the processor core 504 in the remote cluster 302 verifies the error detection code of the transferred updated parity data (S2015). Since the updated parity data in the remote cluster 302 will not be referenced in a short time, the processor core 504 flushes the updated parity data out from the processor cache 502 to the primary storage device 408 (S2016). The updated parity data has been duplicated in the clusters 301 and 302.

Next, the processor core 503 in the local cluster 301 instructs the drive interface LSI 405 to transfer the updated user data in the primary storage device 407 and the updated parity data in the processor cache 501 to the drive 303 (S2017). Then, the processor core 503 flushes the updated parity data out from the processor cache 501 to the primary storage device 407 (S2018) to terminate the processing.

Back to the step S2009, if the type of drive including the address specified by the write command is SSD (SSD at S2009), an access to the drive ends in a short time; accordingly, use of a processor cache results in a short occupation. In the meanwhile, since the bandwidth (access performance) of SSDs is large, the bandwidth of a primary storage device is relatively tight.

Accordingly, the processor 401 writes to a drive 303 using the processor cache 501. Specifically, the processor core 503 instructs the drive interface LSI 405 to transfer the current user data to the processor cache 501 in the local cluster (S2019). Furthermore, it instructs the drive interface LSI 405 to transfer the current parity data to the processor cache 501 (S2020).

Next, the processor core 503 reserves a cache area for storing updated parity data in the remote cluster 302 using the processor core 504 in the remote cluster 302 (S2021). In this example, it reserves a cache area in the primary storage device 408.

Next, the processor core 503 generates parity data with the current user data and the current parity data retrieved from the drive 303 and the updated user data received from the host computer 102 using the DMA 511 in the local cluster 301 to update the parity data (S2022). The updated parity data is immediately referenced for duplication to the remote cluster. Hence, the processor core 503 instructs the DMA 511 to write the updated parity data to the processor cache 501 with hint information.

Next, the processor core 503 instructs the DMA 511 in the local cluster 301 to transfer the updated parity data in the processor cache 501 in the local cluster 301 to the remote cluster 302 (S2023). The data transferred to the remote cluster 302 is immediately referenced for verification of the error detection code. Hence, the processor core 503 instructs the DMA 511 to attach hint information to the data and transfer the data.

Next, the processor core 504 in the remote cluster 302 verifies the transferred updated parity data with its error detection code (S2024). The updated parity data in the remote cluster 302 is not referenced in a short time. Accordingly, the processor core 504 flushes the updated parity data out from the processor cache 502 in the remote cluster 302 to the primary storage device 408 (S2025).

The processor core 503 in the local cluster 301 instructs the drive interface LSI 405 to transfer the updated user data in the primary storage device 407 and the updated parity data in the processor cache 501 to the drive 303 (S2026). Then, the processor core 503 flushes the updated parity data out from the processor cache 501 to the primary storage device 407 (S2027) to terminate the processing.

The configuration of this embodiment enables storage operations using a processor cache, which reduces accesses to the primary storage device. Consequently, the bandwidth of the primary storage device required for storage operations can be reduced so that the storage apparatus can improve its performance. The storage apparatus can exhibit performance higher than the upper limit defined by the bandwidth of the interface for the primary storage device.

The processor cache is used to store data to be referenced in a short time and the storage area is released or the data in the storage area is flushed out immediately after the data is referenced for the storage area to be used for other data. This configuration minimizes the occupation time and the occupied amount of the processor cache, allowing the processor cache to have a smaller capacity. Even though the processor cache has a limited capacity, accesses to the primary storage can be reduced effectively.

As set forth above, a configuration example of this invention has been described, but this invention is not limited to the foregoing configuration example. One skilled in the art can easily modify, add, or convert each element of the foregoing embodiment within a scope of this invention.

The foregoing configuration example determines, in a storage apparatus employing a general-purpose processor, whether to use the processor cache as a data transfer buffer based on the operation (command type) of the storage apparatus and the storage device of the data transfer destination/source. Based on the determination, the front end, the back-end, or the processor attaches a TPH (hint information) of a standard technology of PCIe to data to be transferred and transfers the data directly to the processor cache. As a result, the accesses to the primary storage device can be reduced, so that the storage apparatus can improve in its apparatus performance.

The foregoing configuration example chooses the transfer buffer for user data between the processor cache and the primary storage device based on the retention storage device of the user data designated by a host command. Specifically, the transfer buffer is determined based on the type of the storage drive to store write data and the location of the primary storage device (the cluster the primary storage device belonging to) retaining the user data designated by a read command. The foregoing configuration example uses the processor cache as a data transfer buffer in processing both of a read command and a write command.

The storage system of this invention may use the processor cache as a transfer buffer in processing only either one of a read command and a write command or in transferring data only either one of between clusters and between storage apparatuses. This invention can be applied to a storage apparatus including a single cluster only. Otherwise, it can be applied to a storage apparatus including three or more clusters.

In response to a read command, the foregoing configuration example transfers data retrieved from a storage drive to the processor cache. The storage system of this invention may choose the transfer destination of the data retrieved from the storage drive between the processor cache and the primary storage device based on the type of storage drive to store the data designated by the read command and/or the data length of the data requested by the read command.

For example, in the case of a cache miss, the storage system uses the primary storage device as a data transfer buffer if the storage drive retaining user data is an HDD, and uses the processor cache if the storage drive retaining the user data is an SSD. The storage system may choose the transfer buffer between the processor cache and the primary storage device based on the data length of the data designated by the read command. For example, if the data length is longer than a given threshold, it uses the primary storage device; if the data length is equal to or shorter than the threshold, it uses the processor cache.

This invention can be applied to a storage apparatus that performs data transfer by a protocol other than PCIe, as far as it allows a choice of the destination in data transfer between the processor cache and the primary storage device. The storage system to apply this invention may consist of one or more storage apparatus. The above-described method of data transfer between clusters can be applied to data transfer between two storage apparatuses.

The foregoing configuration example includes an SSD and an HDD for non-volatile storage devices (storage drives) differing in access performance. This invention can be applied to a storage system including non-volatile storage devices other than these.

The invention claimed is:

1. A storage system comprising:
a plurality of non-volatile storage devices for storing user data; and
a controller for controlling data transfer between the plurality of non-volatile storage devices and a host,
wherein the controller includes a processor core circuit, a processor cache, a data transfer circuit, a drive interface circuit, and a primary storage device including a cache area for temporarily storing user data;
wherein the processor core circuit is configured to ascertain contents of a command received from the host;
wherein the processor core circuit is configured to ascertain a retention storage device of data to be transferred in the storage system in operations responsive to the command;
wherein the processor core circuit is configured to determine whether to transfer the data via the processor cache in the storage system, based on a type of the command and the ascertained retention storage device;
wherein, when the determination is to transfer read data from a non-volatile storage device via the processor cache, the processor core circuit is configured to provide the drive interface circuit with an instruction to add hint information to the read data indicating transfer of data to the processor cache;
wherein, when the drive interface circuit receives the instruction, the drive interface circuit is configured to add the hint information to the read data from the non-volatile storage device and transfer the read data with the hint information to the data transfer circuit;
wherein the data transfer circuit is configured to transfer the read data to the processor cache in accordance with the hint information therewith; and
wherein the processor core circuit is configured to determine, based on a type of the non-volatile storage device storing the read data, whether to flush the read data out from the processor cache to the cache area of the primary storage device after transferring the read data in the processor cache to the host.

2. A storage system according to claim 1,
wherein, in response to the received command the type of which is a read command, the processor core circuit is configured to ascertain a storage device to retrieve user data designated by the command, where the storage device is the retention storage device; and
wherein the processor core circuit is configured to determine whether to transfer the data via the processor cache in the data transfer based on the type of the command and the ascertained storage device to retrieve the user data.

3. A storage system according to claim 2,
wherein the controller includes a first cluster and a second cluster;
wherein the first cluster includes the processor core circuit, the processor cache, and the primary storage device;
wherein the second cluster includes a second processor core circuit, a second processor cache, a second primary storage device, and a transfer control device;
wherein the storage device to retrieve the user data is the second primary storage device;
wherein the processor core circuit in the first cluster is configured to determine to use the processor cache as a transfer buffer in transferring the designated user data from the second primary storage device to the host; and
wherein the processor core circuit in the first cluster is configured to instruct the transfer control device to transfer the designated user data from the second primary storage device to the processor cache.

4. A storage system according to claim 2,
wherein the plurality of non-volatile storage devices includes a first non-volatile storage device and a second non-volatile storage device which is slower in response speed than the first non-volatile storage device;
wherein the storage device specified by the read command to retrieve the user data is the second non-volatile storage device;
wherein the processor core circuit determines is configured to determine to use the processor cache as a transfer buffer in transferring the designated user data from the second non-volatile storage device to the host; and
wherein, after the processor core circuit transfers the designated user data retained in the processor cache to the host, the processor core circuit is configured to flush the designated user data out from the processor cache to the primary storage device.

5. A storage system according to claim 2,
wherein the storage device specified by the read command to retrieve the user data is a first non-volatile storage device;

wherein the processor core circuit is configured to determine to use the processor cache as a transfer buffer in transferring the designated user data from the first non-volatile storage device to the host; and wherein, after the processor core circuit transfers the designated user data, which has been stored from the first non-volatile storage device into the processor cache, to the host, the processor core circuit is configured to release the area retaining the designated user data in the processor cache.

6. A storage system according to claim 1,
wherein the processor core circuit is configured to determine whether to use the processor cache as a transfer buffer in data transfer in the controller based on a data length of the user data designated by the received command.

7. A storage system according to claim 1,
wherein the controller includes a first cluster and a second cluster;
wherein the first cluster includes the processor core circuit, the primary storage device, and a transfer control device;
wherein the second cluster includes a second processor core circuit, the processor cache, and a second primary storage device;
wherein the received command is a write command and the retention storage device is the second primary storage device;
wherein, in response to the write command, the processor core circuit is configured to determine to use the processor cache as a transfer buffer in transferring user data received from the host from the first cluster to the second primary storage device;
wherein the processor core circuit is configured to instruct the transfer control device to transfer the user data to the processor cache;
wherein the transfer control device is configured to transfer the user data to the processor cache in accordance with the instruction from the processor core circuit;
wherein the second processor core circuit is configured to verify an error detection code of the user data in the processor cache; and
wherein the second processor core circuit is configured to flush the user data for which the error detection code has been verified from the processor cache out to the second primary storage device.

8. A storage system according to claim 1,
wherein the plurality of non-volatile storage devices include a plurality of first type non-volatile storage devices and a plurality of second type non-volatile storage devices which are slower in response speed than the first type non-volatile storage devices;
wherein the received command is a write command;
wherein the retention storage device is a non-volatile storage device to store user data received from the host;
wherein, in a case where a data length of the user data is equal to or longer than a threshold, the processor core circuit is configured to determine to generate parity data from the designated user data without using data retained in the plurality of non-volatile storage devices;
wherein, in a case where the data length of the user data is shorter than the threshold and the non-volatile storage device to store the user data is a second type non-volatile storage device, the processor core circuit is configured to determine to transfer data to generate parity data for the user data from one or more second type non-volatile storage devices to the primary storage device without using the processor cache.

9. A storage system according to claim 8,
wherein the controller includes a first cluster and a second cluster;
wherein the first cluster includes the processor core circuit, the processor cache, the primary storage device, and a transfer control device;
wherein the second cluster includes a second processor core circuit, a second processor cache, and a second primary storage device;
wherein the processor core circuit is configured to determine to transfer the generated parity data to the second primary storage device via the second processor cache in transferring the generated parity data to the second primary storage device;
wherein the processor core circuit is configured to instruct the transfer control device to transfer the parity data to the second processor cache;
wherein the transfer control device is configured to transfer the parity data to the second processor cache in accordance with the instruction from the processor core circuit;
wherein the second processor core circuit is configured to verify an error detection code for the parity data in the second processor cache; and
wherein the second processor core circuit is configured to flush the parity data for which the error detection code has been verified from the second processor cache out to the second primary storage device.

10. A storage system according to claim 1,
wherein the controller further includes a first transfer control device and a second transfer control device;
wherein the processor core circuit is configured to instruct the first transfer control device to attach information indicating a transfer destination to the data and transfer the data to the second transfer control device;
wherein the second transfer control device is configured to transfer the data to either one of the processor cache and the primary storage device with reference to the information attached to the received data.

11. A method of controlling data transfer in a storage system including non-volatile storage devices, a processor cache, a data transfer circuit, a drive interface circuit, and a primary storage device including a cache area for temporarily storing user data, the method comprising:
ascertaining, by the processor core circuit, contents of a command received from a host;
ascertaining, by the processor core circuit, a retention storage device of data to be transferred in the storage system in operations responsive to the command;
determining, by the processor core circuit, whether to transfer the data via the processor cache in the data transfer in the storage system based on a type of the command and the ascertained retention storage device;
when the determining indicates to transfer read data from a non-volatile storage device via the processor cache, providing, by the processor core circuit, the drive interface circuit with an instruction to add hint information to read data indicating transfer of data to the processor cache;
when the drive interface circuit receives the instruction, adding, by the drive interface circuit, the hint information to the read data from the non-volatile storage device and transferring, by the drive interface circuit, the read data with the hint information to the data transfer circuit;
transferring, by the data transfer circuit, the read data to the processor cache in accordance with the hint information; and determining, by the processor core circuit, based on a type of the non-volatile storage device storing the read data, whether to flush the read data out from the processor cache to the cache area of the primary storage device after transferring the read data in the processor cache to the host.

12. A method of controlling data transfer according to claim 11, further comprising:

ascertaining a storage device to retrieve user data designated by the command, where the storage device is the retention storage device, in response to the received command the type of which is a read command; and determining whether to transfer the data via the processor cache in the data transfer based on the type of the command and the ascertained storage device to retrieve the user data.

13. A method of controlling data transfer according to claim 12, wherein the storage system further includes a first cluster and a second cluster;

wherein the first cluster includes the processor cache and the primary storage device;

wherein the second cluster includes a second processor cache and a second primary storage device; and wherein the storage device to retrieve the user data is the second primary storage device, the method further comprising:

determining to transfer the designated user data from the second primary storage device to the host via the processor cache; and transferring the designated user data from the second primary storage device to the processor cache.

14. A method of controlling data transfer according to claim 11, wherein the storage system includes a first cluster and a second cluster;

wherein the first cluster includes the primary storage device and a transfer control device;

wherein the second cluster includes the processor cache and a second primary storage device;

wherein the received command is a write command and the retention storage device is the second primary storage device;

the method further comprising:

determining to transfer user data received from the host from the first cluster to the second primary storage device via the processor cache in response to the write command;

transferring the user data to the processor cache;

verifying an error detection code of the user data in the processor cache; and flushing the user data for which the error detection code has been verified from the processor cache out to the second primary storage device.

15. A method of controlling data transfer according to claim 11, wherein the non-volatile storage devices include a plurality of first type non-volatile storage devices and a plurality of second type non-volatile storage devices which are slower in response speed than the first non-volatile storage devices;

wherein the received command is a write command; and wherein the retention storage device is a non-volatile storage device to store user data received from the host, the method further comprising:

determining, if a data length of the user data is equal to or longer than a threshold, to generate parity data from the received user data without using data retained in the plurality of non-volatile storage devices; and determining, if the data length of the user data is shorter than the threshold and the non-volatile storage device to store the user data is a second non-volatile storage device, to transfer data to generate parity data for the user data from one or more second non-volatile storage devices to the primary storage device without using the processor cache.

* * * * *